(12) United States Patent
Fabbro et al.

(10) Patent No.: US 12,191,931 B2
(45) Date of Patent: Jan. 7, 2025

(54) DEVICES, SYSTEMS AND METHODS FOR MULTIPLE CHANNEL COMMUNICATION ACROSS AN ISOLATION BARRIER

(71) Applicant: Infineon Technologies Austria AG, Villach (AT)

(72) Inventors: Simone Fabbro, Udine (IT); Matteo Bassi, Villach (AT); Saleh Karman, Villach (AT); Karl Norling, Villach (AT); Fabio Padovan, Villach (AT); Natasa Pojak, Villach (AT)

(73) Assignee: Infineon Technologies Austria AG, Villach (AT)

( * ) Notice: Subject to any disclaimer, the term of this patent is extended or adjusted under 35 U.S.C. 154(b) by 332 days.

(21) Appl. No.: 17/681,176

(22) Filed: Feb. 25, 2022

(65) Prior Publication Data
US 2023/0275621 A1    Aug. 31, 2023

(51) Int. Cl.
*H04B 5/26* (2024.01)
*H04B 1/38* (2015.01)
*H04B 5/72* (2024.01)
*H04L 5/14* (2006.01)

(52) U.S. Cl.
CPC ............ *H04B 5/26* (2024.01); *H04B 1/38* (2013.01); *H04B 5/72* (2024.01); *H04L 5/14* (2013.01)

(58) Field of Classification Search
CPC .... H04B 5/26; H04B 1/38; H04B 5/72; H04L 5/14; H04L 5/1461; H04L 5/0005; H04L 25/0268
USPC ...................................... 455/552.1
See application file for complete search history.

(56) References Cited

U.S. PATENT DOCUMENTS 10,602,590 B1 *   3/2020   Zulim ................. H05B 47/18
2016/0087914 A1 * 3/2016   Goswami .............. H04B 5/72
                                                    370/467

OTHER PUBLICATIONS

"Fundamentals of Integrated Transformers", IEEE Solids-States Circuit Magazine; Fall 2020 [18-19], Nov. 25, 2020, 86-99.
"ISO5452-Q1 High-CMTI 2.5-A and 5-A Isolated IGBT, MOSFET Gate Driver With Split Outputs and Active Protection Features", Texas Instrument, Sep. 2016—Revised Dec. 2016.

(Continued)

*Primary Examiner* — Eugene Yun
(74) *Attorney, Agent, or Firm* — Murphy, Bilak & Homiller, PLLC

(57) ABSTRACT

A device includes: first and second electronic sides; an isolation barrier galvanically isolating the electronic sides from one another and including a signal coupler configured to enable signaling between the electronic sides over the isolation barrier via electromagnetic coupling; and transceiver circuitry included in both electronic sides and configured to implement, based on a frequency response profile of the isolation barrier, full-duplex communication between the electronic sides using the same signal coupler. According to another embodiment of a device, the device includes: electronic circuitry; an isolation barrier galvanically isolating the electronic circuitry and including a signal coupler configured to enable signaling over the isolation barrier via electromagnetic coupling; and transceiver circuitry configured to implement, based on a frequency response profile of the isolation barrier, full-duplex communication between the electronic circuitry of the device and electronic circuitry of another device using the same signal coupler.

26 Claims, 13 Drawing Sheets

(56) References Cited

OTHER PUBLICATIONS

"SN65HVD63 AISG® On and Off Keying Coax Modem Transceiver", Texas Instrument, Jul. 2015.
"UCC21530-Q1 4-A, 6-A, 5.7-kVRMS Isolated Dual-Channel Gate Driver with 3.3-mm Channel-to-Channel Spacing", Texas Instrument, Aug. 2018—Revised Apr. 2021.
"UCC23511-Q1 1.5-A Source, 2-A Sink, 5.7-kVRMS Opto-Compatible Single-Channel Isolated Gate Driver", Texas Instrument, Aug. 2020—Revised Mar. 2021.
"UCC5350SB-Q1 Single-Channel Isolated Gate Driver for SiC/IGBT and Automotive Applications", Texas Instrument, Feb. 2022.
"Dual-Channel Digital Isolators", Analog Devices, ADuM1200/ADuM1201, Author Unknown, Sep. 2016, pp. 1-28.

* cited by examiner

DEVICES, SYSTEMS AND METHODS FOR MULTIPLE CHANNEL COMMUNICATION ACROSS AN ISOLATION BARRIER

BACKGROUND

Many applications such as gate drivers, isolated digital input ICs (digital isolators), etc. attempt multi-channel communication across an isolation barrier. The isolation barrier enables communication between two chips (dies) whose power and signal domains are galvanically isolated from one another. Signal communication across two isolated domains typically involves a dedicated isolation barrier for each communication channel, in either direction, resulting in a relevant amount of area and components at different integration levels.

The communication between two sides of an isolation barrier usually relies on two main methods to encode transmitted/received information. One method involves sending finite energy (voltage/current) pulses. This method is inherently related to time multiplexing whereby different pulses are spaced in time, and inherently affected by the need to introduce time delays in a number of time slots which is proportional to the amount of information to be exchanged. Different time slots can be assigned to the transmission of different information in either direction. However, only one time slot in either direction can be used at a time, resulting at best in a sort of half-duplex communication. With this method, time delay can become an issue in case particularly short propagation times are required for transmitting and receiving information. An advantage of this method is that since the transmitted pulses have a finite energy, the power required for the transmission is limited to the energy of the sparse pulses averaged in time and can be therefore quite limited, depending on the pulse repetition rate.

The other method involves sending a plain or modulated frequency carrier. This method can be used in combination with time multiplexing, in that the presence or absence of a carrier frequency is already a way of basically encoding information (ON-OFF keying (OOK), encoding, etc.). This technique does not require the constant transmission of a carrier and therefore offers acceptably low power. Pushing time multiplexing further, different time slots can be assigned to the transmission of different information assigned to a carrier in either direction, thus facing the same limitations as the first method but also with the added delay associated with communication based on pulse transmission and incurring higher power. In a single direction, multiple information may be further encoded by using more advanced modulation techniques (amplitude, phase, frequency). However, modulation schemes also use time to distinguish different information, which adds delay and requires constant power to be transmitted.

Hence, there is a need for an improved technique for multi-channel communication across an isolation barrier.

SUMMARY

According to an embodiment of a device, the device comprises: a first electronic side; a second electronic side; an isolation barrier galvanically isolating the first electronic side and the second electronic side from one another, the isolation barrier including a signal coupler configured to enable signaling between the first and second electronic sides over the isolation barrier via electromagnetic coupling; and transceiver circuitry included in both the first and second electronic sides and configured to implement, based on a frequency response profile of the isolation barrier, full-duplex communication between the first and second electronic sides using the same signal coupler.

According to another embodiment of a device, the device comprises: electronic circuitry; an isolation barrier galvanically isolating the electronic circuitry, the isolation barrier including a signal coupler configured to enable signaling over the isolation barrier via electromagnetic coupling; and transceiver circuitry configured to implement, based on a frequency response profile of the isolation barrier, full-duplex communication between the electronic circuitry of the device and electronic circuitry of another device using the same signal coupler.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide devices, systems, and methods for full duplex multi-channel communication over a single isolation barrier (e.g., capacitive or inductive), even in opposite directions. On the transmitter side, the most suitable frequency range, signal generation method and signal strength may be chosen for a reliable transmission and reception. On the receiver side, signal reception and demodulation is implemented for proper data reconstruction.

The communication approach described herein may be based on Frequency Division Multiplexing (FDM) applied to a single communication channel in the adopted electrical galvanic isolation barrier. FDM involves sending different data flows by separating them in suitable frequency slots, which can be assigned to a different frequency carrier each, rather than in time slots like in time multiplexed communication. FDM can be also combined with amplitude, phase, and/or frequency modulation, where data can be encoded not only in the presence of a carrier frequency but, if desired, also in signal amplitude and/or phase or frequency shifts. Based on system requirements and isolation barrier constraints, the communication approach described herein may involve transmitting the necessary data by using a single isolation barrier.

Signals with carrier frequencies to be transmitted and received across the isolation barrier may be generated by known oscillator topologies such as LC oscillator, ring oscillator, relaxation, etc., and which can be directly or indirectly coupled to the isolation barrier. In case of direct coupling, the isolation barrier becomes a substantial element of the oscillator topology (e.g., the inductance or the capacitance of the oscillator resonator).

Receivers may support FDM and be based on band-pass filters for the selection of the desired carrier frequency. Once passed through the band pass filters, signals can be detected by peak detectors, as in OOK, if simple carrier encoding is applied, or by more complex state of the art demodulators in case that modulation techniques are applied. The filter requirements and topology depend on the carrier frequencies and amplitudes. Amplification of the filtered signal is optional and depends on the original signal amplitude. Detection of the received signal should in general determine the smallest possible overall propagation delay.

Described next, with reference to the figures, are exemplary embodiments of the devices, systems, and methods for implementing full duplex multi-channel communication over a single isolation barrier.

Figure 1:
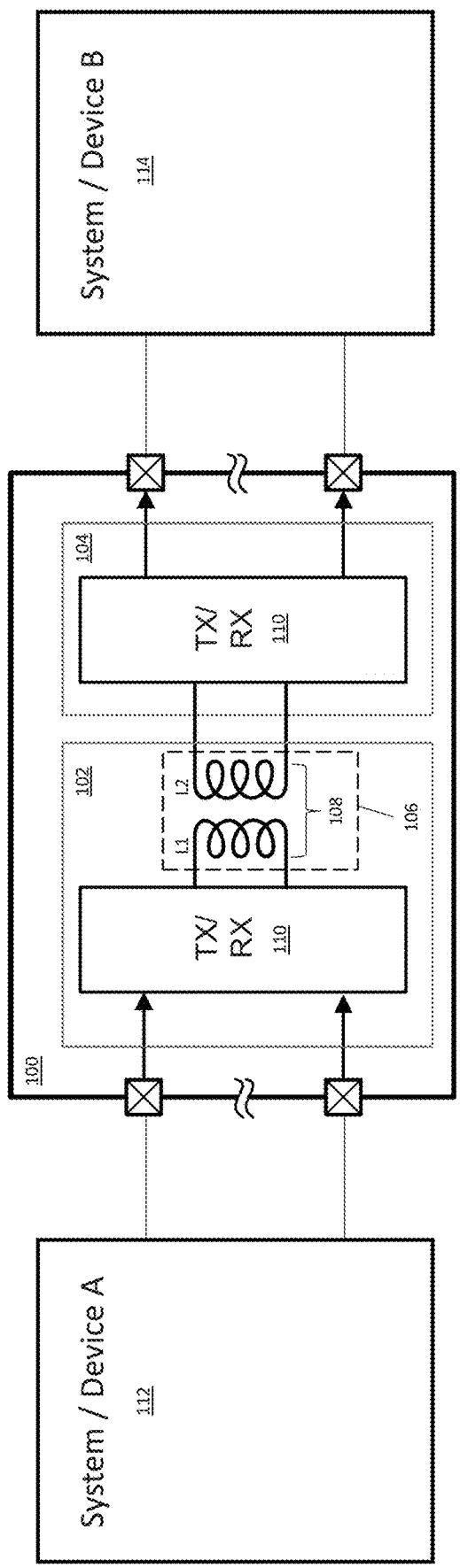
FIG. 1 illustrates an embodiment of a device that includes a first electronic side, a second electronic side and an isolation barrier galvanically isolating the electronic sides from one another.

FIG. 1 illustrates an embodiment of a device 100 that includes a first electronic side 102, a second electronic side 104 and an isolation barrier 106 galvanically isolating the first electronic side 102 and the second electronic side 104 from one another. The first and second electronic sides 102, 104 may be semiconductor chips (dies), packages, modules, PCBs (printed circuit boards), etc. The isolation barrier 106 that galvanically isolates the first electronic side 102 and the second electronic side 104 from one another includes a signal coupler 108 that enables signaling between the first and second electronic sides 102, 104 over the isolation barrier 106 via electromagnetic coupling. The isolation barrier 106 may be fully integrated in the first electronic side 102 or the second electronic side 104, partly integrated in the first electronic side 102 and partly integrated in the second electronic side 104, or implemented as a discrete component separate from the first and second electronic sides 102, 104. The signal coupler 108 is illustrated as an inductive coupler in FIG. 1, having a first coil L1 and a second coil L2 galvanically isolated from one another but coupled via electromagnetic induction. The signal coupler 108 instead may be a capacitive coupler, for example.

Figure 2:
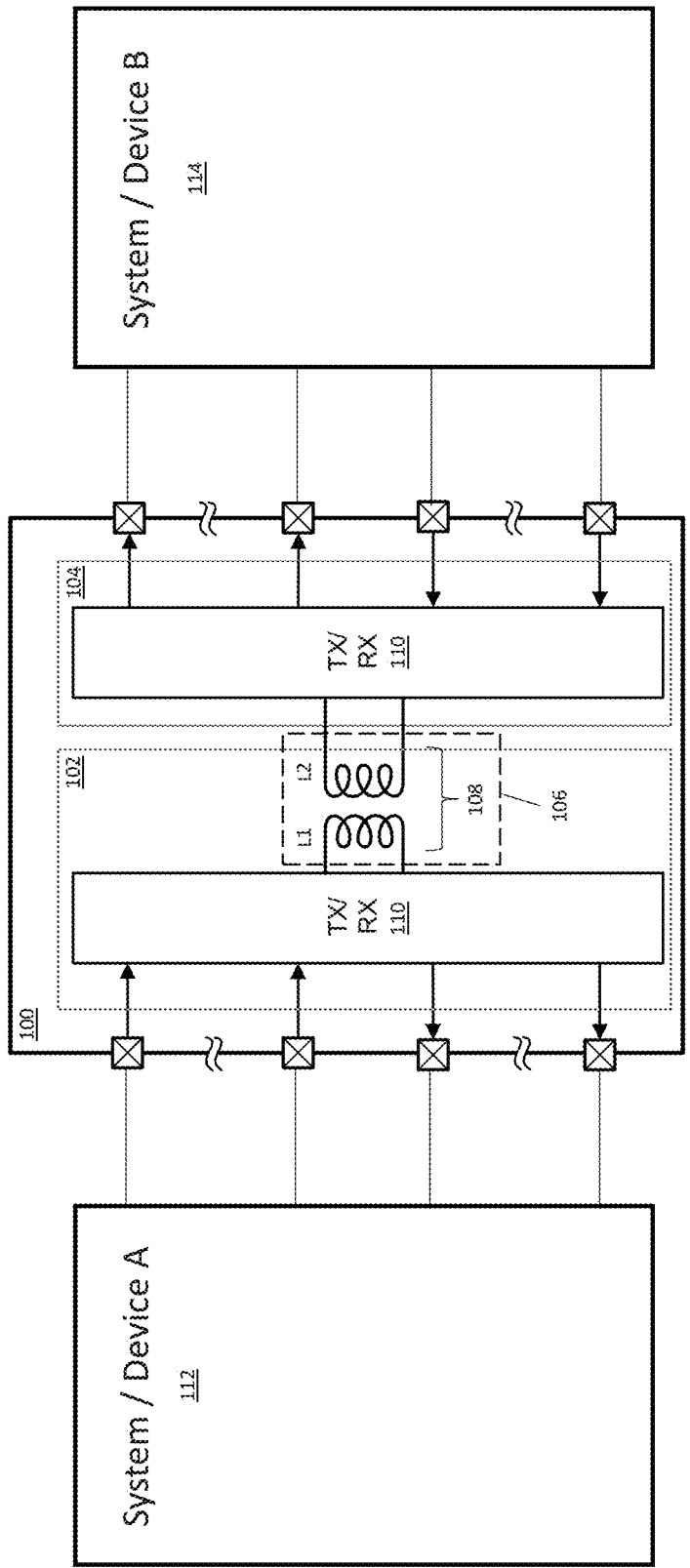
FIG. 2 illustrates another embodiment of a device that includes a first electronic side, a second electronic side and an isolation barrier galvanically isolating the electronic sides from one another.

Transceiver (TX/RX) circuitry 110 is included in both the first electronic side 102 and the second electronic side 104 of the device 100. The transceiver (TX/RX) circuitry 110 implements, based on a frequency response profile of the isolation barrier 106, full-duplex communication between the first and second electronic sides 102, 104 of the device 100 using the same signal coupler 108. The full-duplex communication between the first and second electronic sides 102, 104 of the device 100 may be in a single direction as shown in FIG. 1, or in both directions as shown in FIG. 2. Accordingly, the transceiver circuitry 110 included in the first electronic side 102 and/or the second electronic side 104 may implement multi-channel communication over the isolation barrier 106.

In general, the device 100 may be just a digital isolator or may include additional circuitry and functionality. In the case of a digital isolator, the first electronic side 102 of the device 100 is a primary side of the digital isolator and the second electronic side 104 of the device 100 is a secondary side of the digital isolator. The primary side 102 of the digital isolator 100 is electrically coupled to any type of electronic system or device 112. The secondary side 104 of the digital isolator 100 is likewise electrically coupled to any type of electronic system or device 114. In this example, the transceiver circuitry 110 included in both electronic sides 102, 104 of the digital isolator 100 may simultaneously transmit a first signal from the primary side 102 to the secondary side 104 and a second signal from the secondary side 104 to the primary side 102 using the same signal coupler 108 and based on the frequency response profile of the isolation barrier 106.

In another example, a microcontroller or other type of electronic system or device 112 such as a system board may be electrically coupled to the first electronic side 102 of the device 100. One or more power modules or other type of power electronic system or device 114 may be electrically coupled to the second electronic side 104 of the device 100. The second electronic side 104 of the device 100 may include a gate driver for each power transistor included in the power electronic system/device 114 and the first electronic side 102 of the device 100 may include control circuitry for the gate driver. In this example, the transceiver circuitry 110 included in both electronic sides 102, 104 of the device 100 may simultaneously transmit a modulation signal such as a PWM (pulse width modulation) signal from the first electronic side 102 to the second electronic side 104 and a telemetry signal such as a current, voltage or temperature signal from the second electronic side 104 to the first electronic side 102 using the same signal coupler 108 and based on the frequency response profile of the isolation barrier 106. Still other types of systems/devices may be coupled using the device 100. Various embodiments of the communication system implemented by the device 100 are described in the following.

Figure 3:
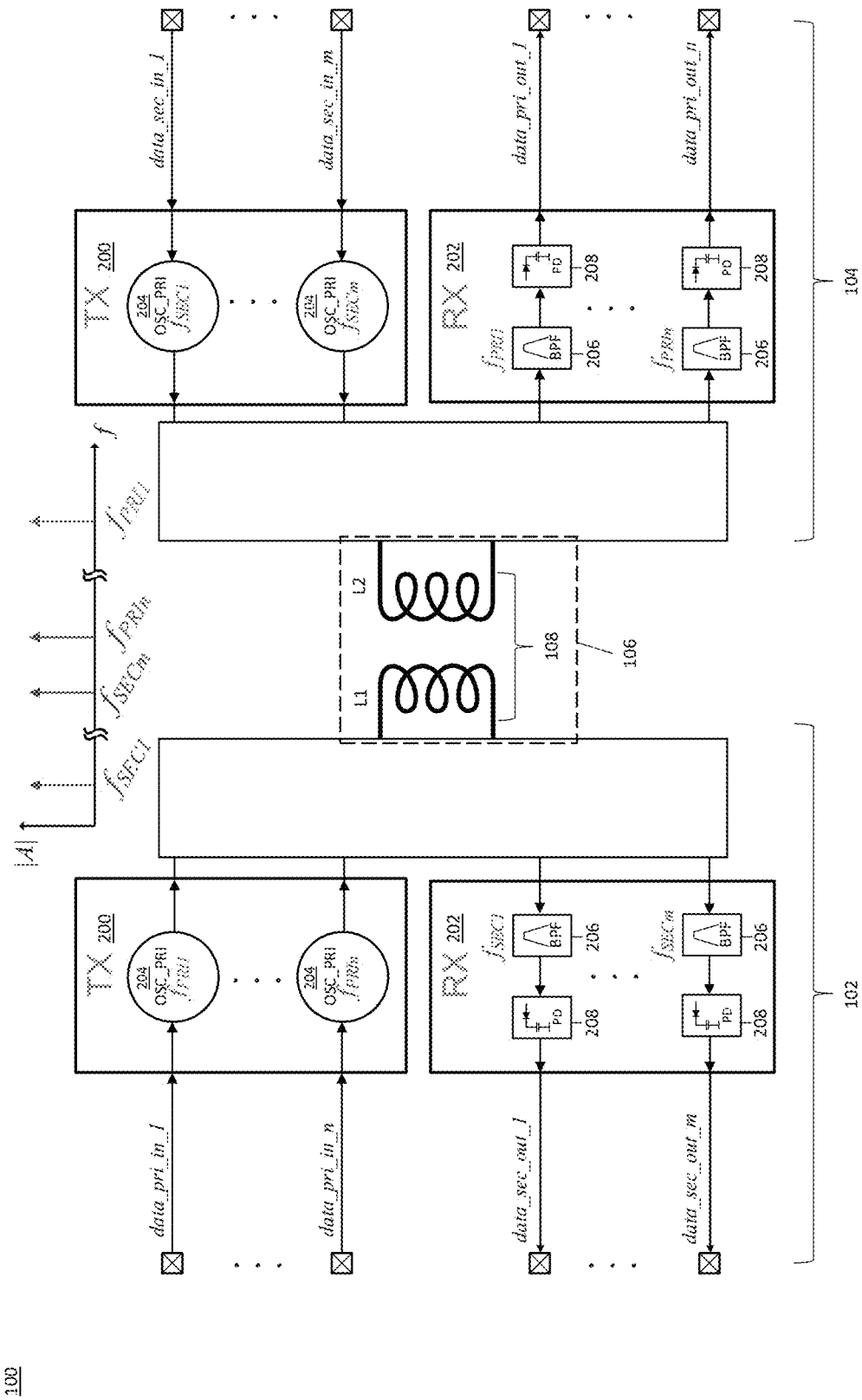
FIG. 3 illustrates an embodiment of the communication system implemented by the device based on FDM (frequency division multiplexing) communication.

FIG. 3 illustrates an embodiment of the communication system implemented by the device 100 based on FDM (frequency division multiplexing) communication, e.g., in the case of an inductive isolation barrier 106. The transceiver circuitry 110 included in both electronic sides 102, 104 of the device 100 includes transmitter circuitry (TX) 200 and receiver circuitry (RX) 202. The transmitter circuitry 200 on each electronic side 102, 104 of the device 100 includes oscillators ('OSC_PRI', 'OSC_SEC') 204 which generate desired carrier frequencies $f_{PRIn}$, $f_{SECn}$ that are directly or indirectly coupled to the signal coupler 108 of the isolation barrier 106. The receiver circuitry 202 on each electronic side 102, 104 of the device 100 separate the frequency of interest through respective band-pass filters ('BPF') 206 whose center frequency matches the corresponding frequency carrier, and which is further revealed by peak detectors ('PD') 208.

The FDM method may be used in combination with OOK (ON-OFF keying) for generating the signals that are to be applied to the terminals of the signal coupler 108 of the isolation barrier 106, to transmit the data to the opposite side of the isolation barrier 106. In one embodiment using OOK, input data ('data_pri_in_n', 'data_sec_in_n') represent bitstreams whose value can be a logic '0' or a logic '1'. When an input datum for a forward or back channel is '0', the respective oscillator 204 is turned off such that no carrier is generated and no signal is provided at the input of the signal coupler 108. The transmitter part 200 is inactive, which allows reduced current consumption. When the datum is '1', the respective oscillator 204 is turned on and a corresponding signal with the desired carrier frequency $f_{PRIn}/f_{SECn}$ is generated and transmitted over the isolation barrier 106. While the datum is '1', the carrier is present and can be detected at the receiver side 202.

The carrier frequency may be much higher than the data rate, enabling fast detection and small propagation delay. The choice of carrier frequencies is adjusted to the frequency response of the isolation barrier 106, so that the isolation barrier 106 is sufficiently transparent for all carriers being transmitted. For example, in case that the isolation barrier 106 is a transformer used as a part of the resonator in the oscillators 204, the transformer frequency response in the transmission direction should be inductive in the frequency range where the carrier frequencies are being generated. For a capacitive isolation barrier 106, a capacitive response is required. Depending on the parasitic capacitances and inductances associated to the isolation barrier 106, a purely inductive or capacitive frequency response may require careful design. Preferably, all data flows are transmitted simultaneously in both forward and back channels, over the same isolation barrier 106.

According to one embodiment, each data flow corresponds to one carrier frequency, which can be filtered out and separated on the receiver side 202, so that data can be properly decoded according to the OOK technique employed. However, this approach can be pushed only up to a certain extent due to limitations which depend on the isolation barrier 106, chosen topology (e.g., whether the isolation barrier 106 is part of the carrier frequency generation), achievable filtering requirements, circuitry or chip technology constraints, amount of data to be sent simultaneously, etc. In case that one or more of these limits prove challenging and only a limited number of carriers can be sent/received at the same time, additional techniques may be applied, which may introduce some constraints in terms of some loss in simultaneity of information transmission.

For example, two or more data can be sent by using different carrier frequencies, where instead of having a single datum encoded per carrier frequency, a group of data can be encoded in the same carrier. In this case, the presence of a carrier at a certain frequency implies the communication of a fixed configuration of grouped data, while the absence of that carrier implies a different fixed configuration of those data is transmitted at once. Accordingly, if a carrier frequency is present, this implies for example that the data group {datum_a, datum_b, datum_c, . . . }={1,0,1, . . . } is transmitted, while if that carrier frequency is absent, this implies that {datum_a, datum_b, datum_c, . . . }= {0,1,0, . . . } is transmitted.

In another example, time multiplexing may be applied to the same OOK carrier so that the same carrier sent/detected or not in different time slots is assigned to different data. In another example, different modulation schemes may be applied to the same carrier, such as amplitude or phase modulation, or a combination of both, with signal detection according to known techniques. The modulation is then used to encode the information which belongs to different data flows. In this case, the modulated carriers can either be transmitted with OOK or be constantly transmitted with the modulation scheme being time multiplexed for carrying different data at different time slots. Any combination of these techniques may be employed, e.g., time multiplexing with different modulation schemes, different carrier frequencies with time multiplexing, different modulation schemes with different carrier frequencies, etc.

Figure 4:
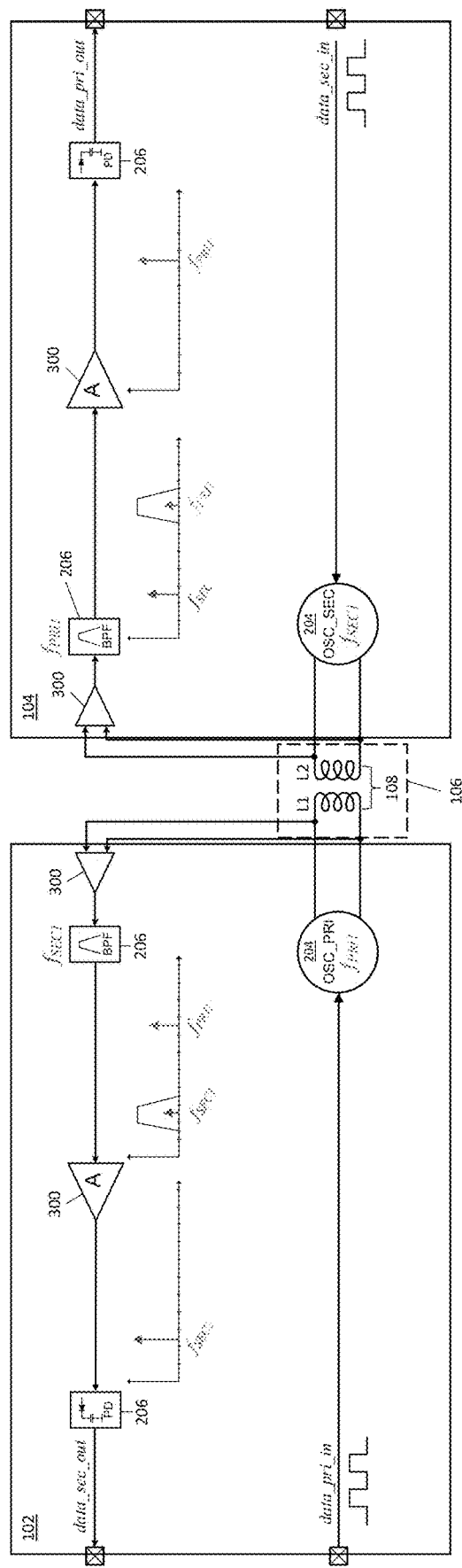
FIG. 4 illustrates an embodiment of a full-duplex communication scheme implemented by the device.

FIG. 4 illustrates an embodiment of the full-duplex communication scheme implemented by the device 100. According to this embodiment, an oscillator 'OSC_PRI' 204 on the first electronic side 102 is tuned to a first carrier frequency $f_{PRI1}$ that corresponds to a first resonance frequency of the isolation barrier 106. An oscillator 'OSC_SEC' 204 on the second electronic side 104 is tuned to a second carrier frequency $f_{SEC1}$ that corresponds to a second resonance frequency of the isolation barrier 106. A bandpass filter 'BPF' 206 on the first electronic side 12 is tuned to the second carrier frequency $f_{SEC1}$ and a bandpass filter 206 on the second electronic side 104 is tuned to the first carrier frequency $f_{PRI1}$, where the respective peak detector 208 outputs a corresponding recovered data signal 'data_sec_out', 'data_pri_out'. Both electronic sides 102, 104 may include one or more amplifiers 300 for providing signal amplification before and/or after the bandpass filtering. In one embodiment, the carrier frequency $f_{SEC1}$ of the oscillator OSC_SEC 204 on the second electronic side 104 is at a harmonic of the carrier frequency OSC_PRI of the first electronic side 102.

Based on the injection locking theory of LC oscillators, oscillation frequencies at the primary and secondary sides of a transformer have a certain relation. Particularly, optimal results can be obtained if a carrier and its odd harmonics, e.g., the $3^{rd}$ or the $_5$th, are selected such that $f_{PRI1}=f_{SEC1}$ or $f_{PRI1}=⅓·f_{SEC1}$, $f_{PRI1}=5·f_{SEC1}$ or $f_{PRI1}=⅕·f_{SEC1}$, etc. For the simultaneous transmission from the first and second electronic sides 102, 104, frequencies should not be chosen freely and independently, but instead by setting one frequency with the other frequency already defined.

Due to the same injection locking constraint, two or more LC oscillators should not operate simultaneously at different frequencies at a single transmitter side, meaning that only one frequency can be transmitted at a time from one side (e.g., $f_{PRI1}$, but not $f_{PRI1}$ and $f_{PRI2}$). This implies that if more than one data flow needs to be transmitted over the isolation barrier 106 in one direction with this particular topology, where the reactance of the isolation barrier 106 is part of a resonator, additional techniques must be applied as explained herein, e.g., by sending different carrier frequencies and/or using time multiplexing applied to the same OOK carrier.

Figure 5:
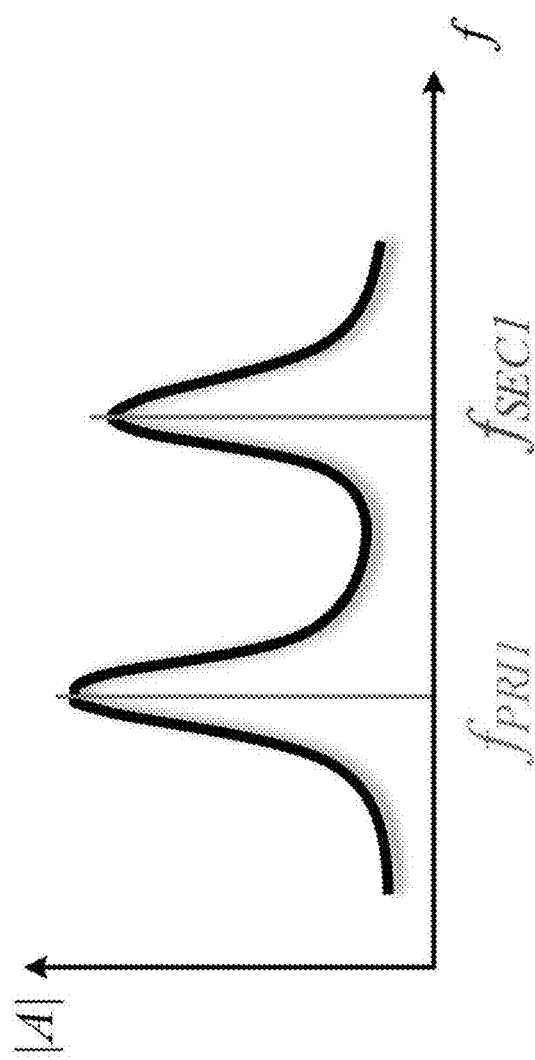
FIG. 5 illustrates a qualitative frequency response of a resonator using the reactance of the isolation barrier.

Such techniques also can be applied to one-directional communication with more than one data flow, with no back channel, which allows a single carrier frequency to be chosen more freely. Exploiting the reactance of the isolation barrier 106 as a part of the resonator used for generating carrier frequencies, beside determining a constraint on the carrier frequencies, also determines a constraint on the carrier amplitudes. This is due to the necessary impedance shaping of the resonator so that oscillator locking is achieved at both sides, the quality factor of the resonator and the coupling effectiveness (coupling coefficient) which the particular isolating element offers from one side to the other. These parameters should be set to determine a frequency response of the resonator which includes the isolation barrier as qualitatively shown in FIG. 5. Hence, the generated signal amplitudes follow the constraints set by that frequency response.

Despite the limit of a single data flow per direction which can be transmitted/received simultaneously, the main advantage of exploiting the reactance of the isolation barrier 106 in the resonator is that a reasonable signal amplitude for signal communication can be obtained at a reasonable current consumption or power expense. Indeed, the carrier frequencies may be generated by exploiting a resonance and by coupling the generated carrier across the isolation barrier 106 right where it is generated, without spending power in additional processes. With the simplest encoding (e.g., OOK), the presence or absence of a carrier frequency in one of the communication channels can be decoded as a logic 1 or a logic 0, respectively. More sophisticated encodings may consider the carrier sent through a communication channel to be modulated, e.g., in amplitude, frequency and/or phase within the bandwidth of the established communication channel, which depends on the band pass filters 206, by modulating the values of the variable reactances accordingly (e.g., with switched fixed reactances or varactor devices in case of variable capacitances). The demodulation can be then carried out according to known demodulation schemes and architectures.

In FIG. 4, the reactance of the isolation barrier 106 forms part of the resonance of the oscillators 204 on both sides 102, 104 of the isolation barrier 106. The device 100 operates with one oscillator 204 at each side 102, 104, with both oscillators 204 using the reactance of the isolation barrier 106 as an element of their respective resonator, which provides the frequency response of the isolation barrier 106 shown in FIG. 5. The transceiver circuitry 110 simultaneously transmits the first carrier frequency $f_{PRI1}$ modulated with first data 'data_pri_in' via the oscillator 204 on the first electronic side 102 and the second carrier frequency $f_{SEC1}$ modulated with second data via 'data_sec_in' via the oscillator 204 on the second electronic side 104. The transceiver circuitry 110 also simultaneously recovers the second data data_sec_in via the bandpass filter 206 on the first electronic side 102 and the first data data_pri_in via the bandpass filter 206 on the second electronic side 104.

Figure 6:
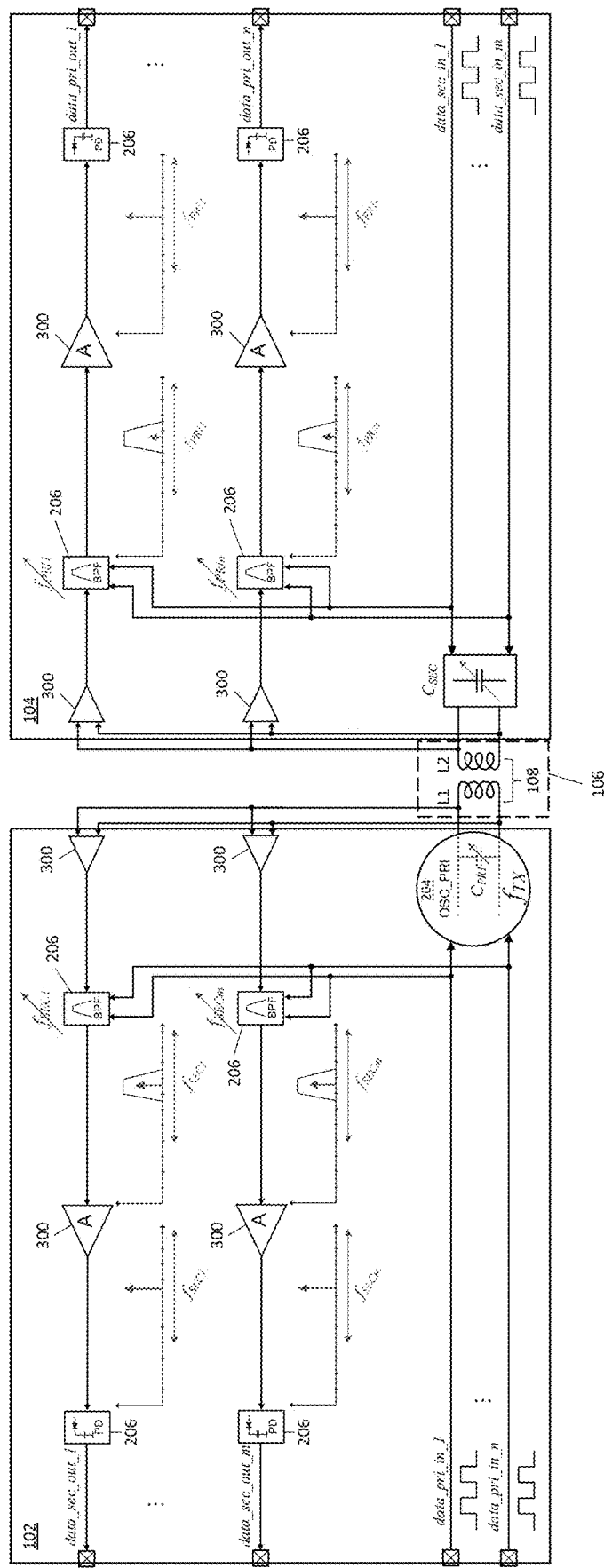
FIG. 6 illustrates another embodiment of a full-duplex communication scheme implemented by the device.

FIG. 6 illustrates another embodiment of the full-duplex communication scheme implemented by the device 100. According to this embodiment, there is only one oscillator 204 and therefore only one carrier frequency. The reactance of the isolation barrier 106 is used as an element of the resonator of the single oscillator 204 and has frequency response shown in FIG. 7.

The information encoding is in the shift of the single carrier frequency according to the setting of the variable reactance on the first or second electronic side 102, 104, with each frequency shift falling into an associated bandpass filter 206. For example, if the starting condition for the variable reactances at the first and second electronic sides 102, 104 are Xfirst_1 and Xsecond_1, the oscillator 20 may start by generating a carrier frequency f1. The second electronic side 104 knows that it is receiving an f1 carrier which is detected by the related bandpass filter 206 on the second electronic side 104. With this knowledge, and by keeping the information associated to the occurrence that a carrier from the first electronic side 102 is being sent, the second electronic side 104 decides to communicate something to the first electronic side 102 by changing Xsecond_1 to Xsecond_2 and by shifting the single carrier, still generated at the first electronic side 102, from f1 to f2. At the same time, the second electronic side adapts its bandpass filter 206 so that the frequency shift is taken into account and the bandpass filter 206 can still detect the single carrier. The first electronic side 102, which was previously seeing its own generated carrier falling into a bandpass filter 206 centered at f1, now sees a single carrier falling into a different bandpass filter 206 centered at f2. Hence, the single carrier, shifted by a reactance change at the second electronic side 104, is still sending the same information from the first electronic side 102 to the second electronic side 104 without interruption, but the shift determined by a reactance change at the second electronic side 104 may concurrently indicate to the first electronic side 102 that something happened.

Something similar can happen if the first electronic side 102 decides to transmit a different information to the second electronic side 104. The first electronic side 102 knows that it is generating an f1 carrier, detected by a related bandpass filter 206 on the first electronic side 102. With this knowledge, and by keeping the information associated to the occurrence that a carrier from the first electronic side 102 is being sent, the first electronic side 102 may decide to communicate something different to the second electronic side 104 by changing Xfirst_1 to Xfirst_2 and by shifting the single carrier, still generated at the first electronic side 102, from f1 to f2. At the same time, the first electronic side 102 adapts its bandpass filter 206 so that the frequency shift is taken into account and the bandpass filter 206 can still detect the single carrier. The second electronic side 104, which was previously seeing a transmitted carrier falling into a bandpass filter 206 centered at f1, now sees a single carrier falling into a different bandpass filter 206 centered at f2. Hence, the single carrier, shifted by a reactance change at the first electronic side 102, continues to send the same information from second electronic side 104 to the first electronic side 102 without interruption, but the shift determined by a reactance change at the first electronic side 102 could concurrently indicate to the second electronic side 104 that something happened.

Hence, the information encoding is in the shift of a single carrier in FIG. 4, with the flow direction (second side to first or vice-versa) being determined based on whether the second electronic side 104 or the first electronic side 102 caused the frequency shift. As a particular case, certain information can be encoded by the single carrier frequency falling in none of the bandpass filters 206 on either side 102, 104 which also coincides with no carrier frequency generated at all.

Figure 8:
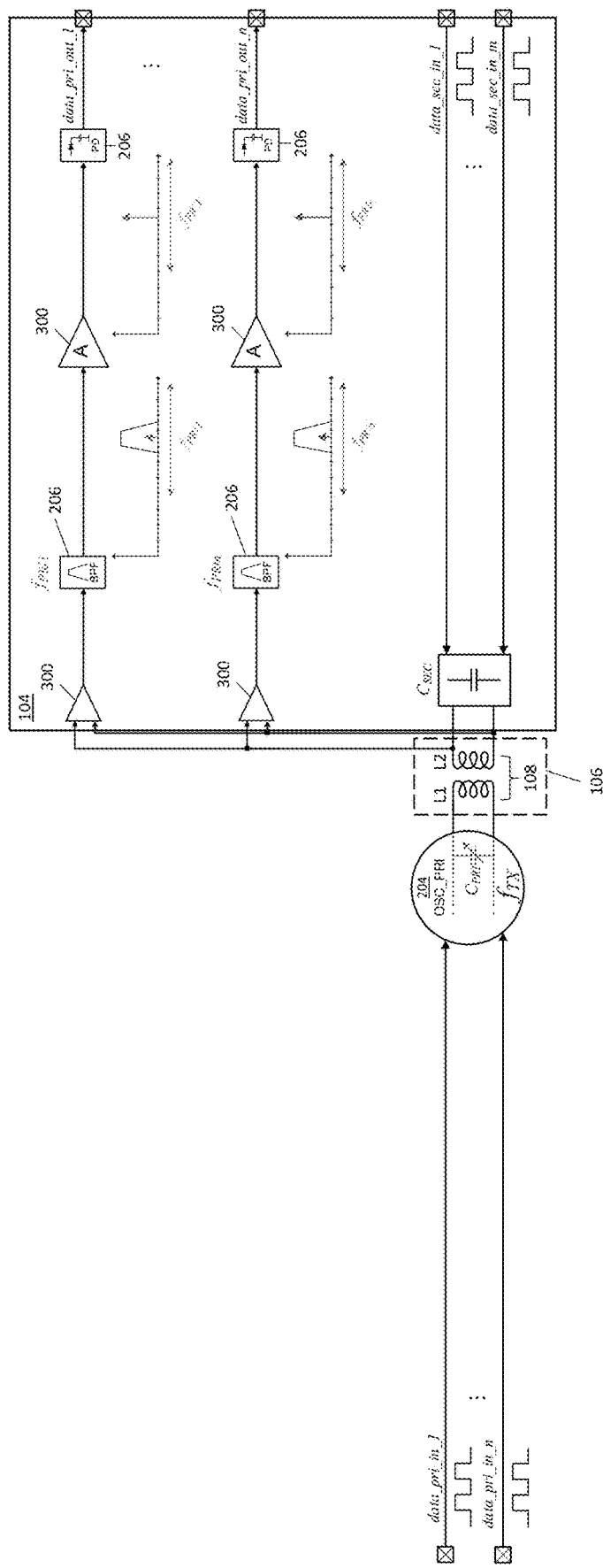
FIG. 8 illustrates the embodiment of FIG. 6 simplified to show the transmission in a single direction from the first electronic side to the second electronic side of the device.
Figure 9:
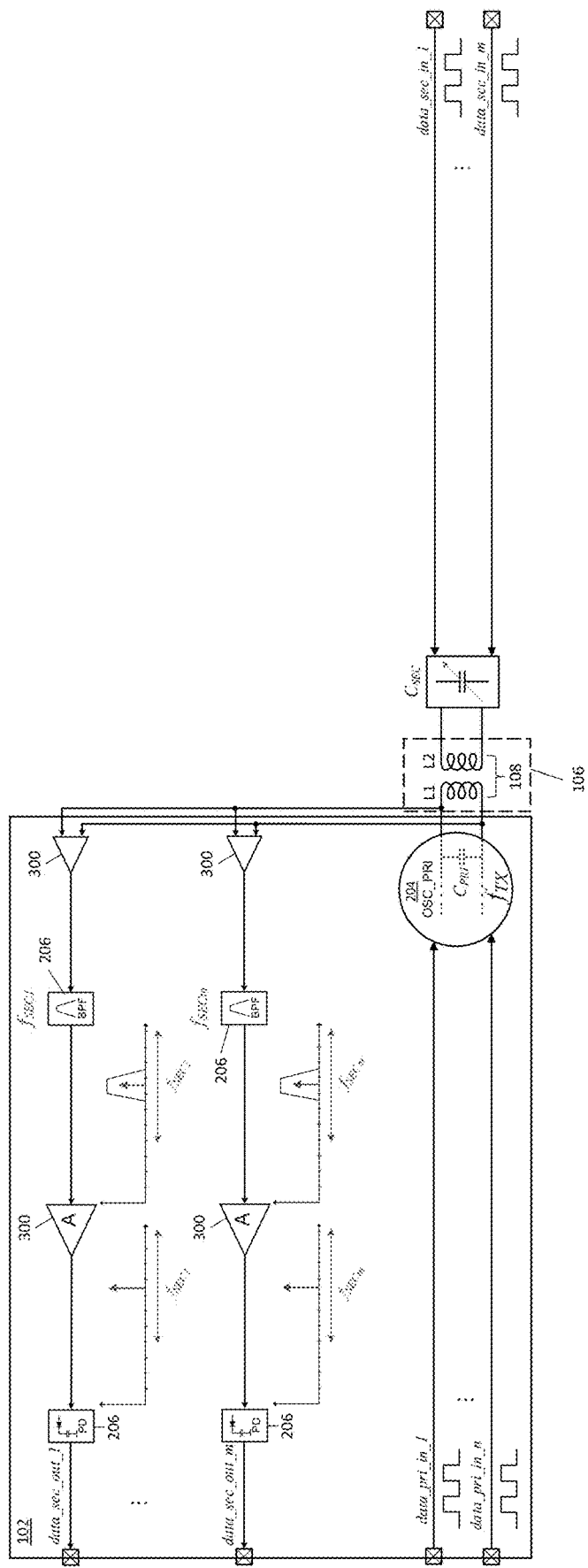
FIG. 9 illustrates the embodiment of FIG. 6 simplified to show the transmission in a single direction from the second electronic side to the first electronic side of the device.

FIG. 8 illustrates the embodiment of FIG. 6 simplified to show the transmission in a single direction from the first electronic side 102 to the second electronic side 104. FIG. 9 illustrates the embodiment of FIG. 6 simplified to show the transmission in a single direction from the second electronic side 104 to the first electronic side 102.

According to the embodiment of FIG. 6, the reactance of the isolation barrier 106 is part of the resonator of a single oscillator 204 on only one side of the isolation barrier 106 and which transmits towards the other side but can still carry out bi-directional communication through a passive realization on the other side of the isolation barrier 106. The single oscillator 204 is shown on the first electronic side 102 in FIGS. 6, 8 and 9 but instead may be on the second electronic side 104. In either case, the single oscillator 204 has a carrier frequency $f_{TX}$ that corresponds to a resonance frequency of the isolation barrier 106. A variable reactance '$C_{PRI}$' on the first electronic side 102 and a variable reactance '$C_{SEC}$' on the second electronic side 104 form an equivalent reactance 'Ceq'. The equivalent reactance Ceq shifts the carrier frequency $f_{TX}$ to one of a plurality of shifted frequencies $f_{PRI1} \ldots f_{PRIn}, f_{SEC1} \ldots f_{SECn}$. A filter circuit on the first electronic side 102 has a respective bandpass filter 206 tuned for each shifted frequency $f_{SEC1} \ldots f_{SECn}$, and a filter circuit on the second electronic side 104 has a respective bandpass filter 206 tuned for each shifted frequency $f_{PRI1} \ldots f_{PRIn}$.

In FIGS. 6 through 9, the device transceiver circuitry 110 sets the first variable reactance $C_{PRI}$ to a first reactance value based on first data 'datapri_in_n' at the first electronic side 102 and sets the second variable reactance $C_{SEC}$ to a second reactance value based on second data 'data_sec_in_n' at the second electronic side 104. The device transceiver circuitry 110 also simultaneously recovers the second data via the bandpass filter 206 of the filter circuit on the first electronic side 102 tuned to the corresponding frequency $f_{SEC1} \ldots f_{SECn}$ associated with the second reactance value and the first data via the bandpass filter 206 of the second filter circuit on the second electronic side 104 tuned to the corresponding frequency $f_{PRI1} \ldots f_{PRIn}$ associated with the first reactance value. For a shift in the carrier frequency brought about by a change in the first variable reactance $C_{PRI}$ on the first electronic side 102 or by a change in the second variable reactance $C_{SEC}$ on the second electronic side 104, the device transceiver circuitry 110 changes the center frequency of each bandpass filter 206 on the electronic side 102/104 at which the shift in the variable reactance is implemented, by an amount corresponding to the shift in the carrier frequency.

Figure 10:
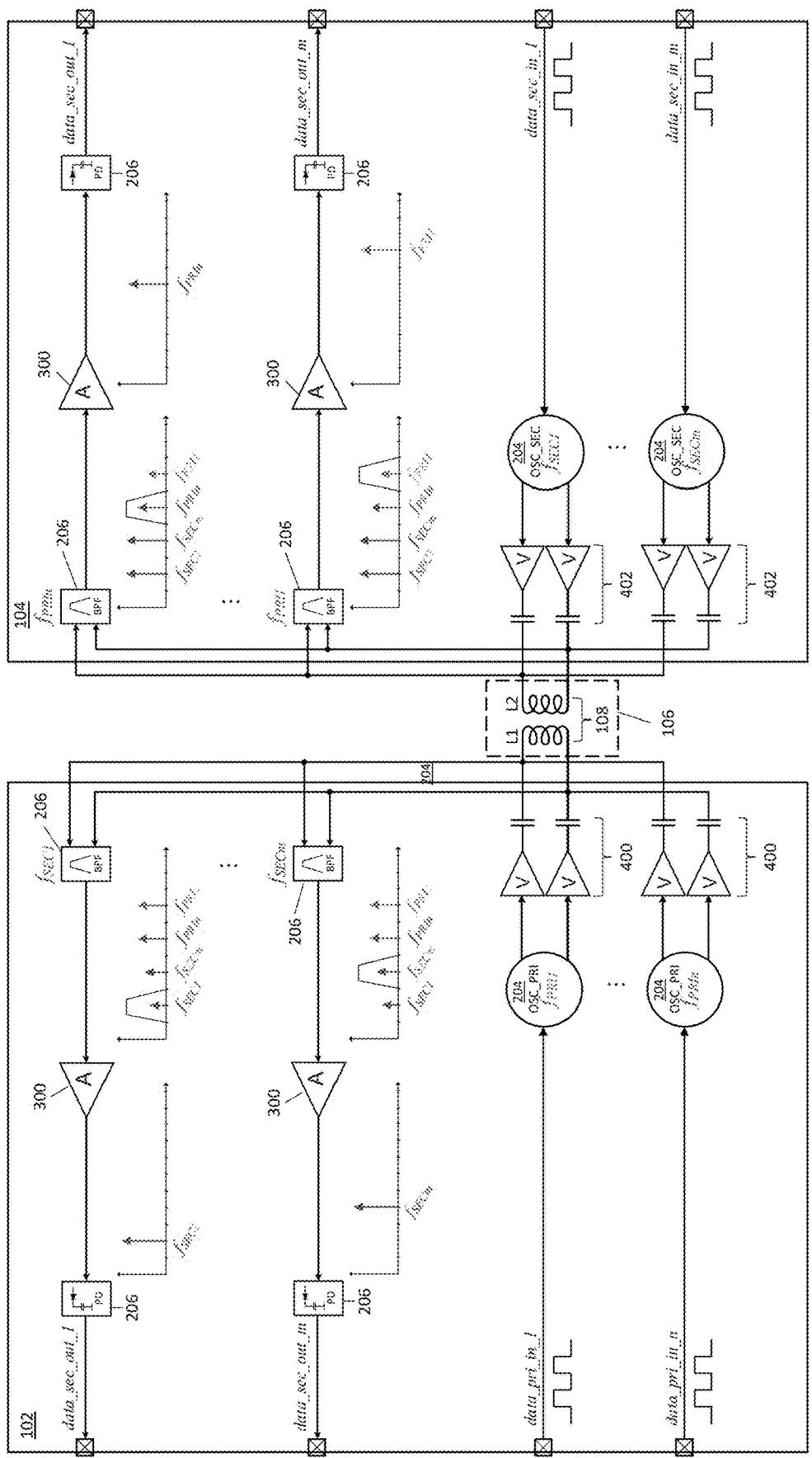
FIG. 10 illustrates another embodiment of a full-duplex communication scheme implemented by the device.
Figure 11:
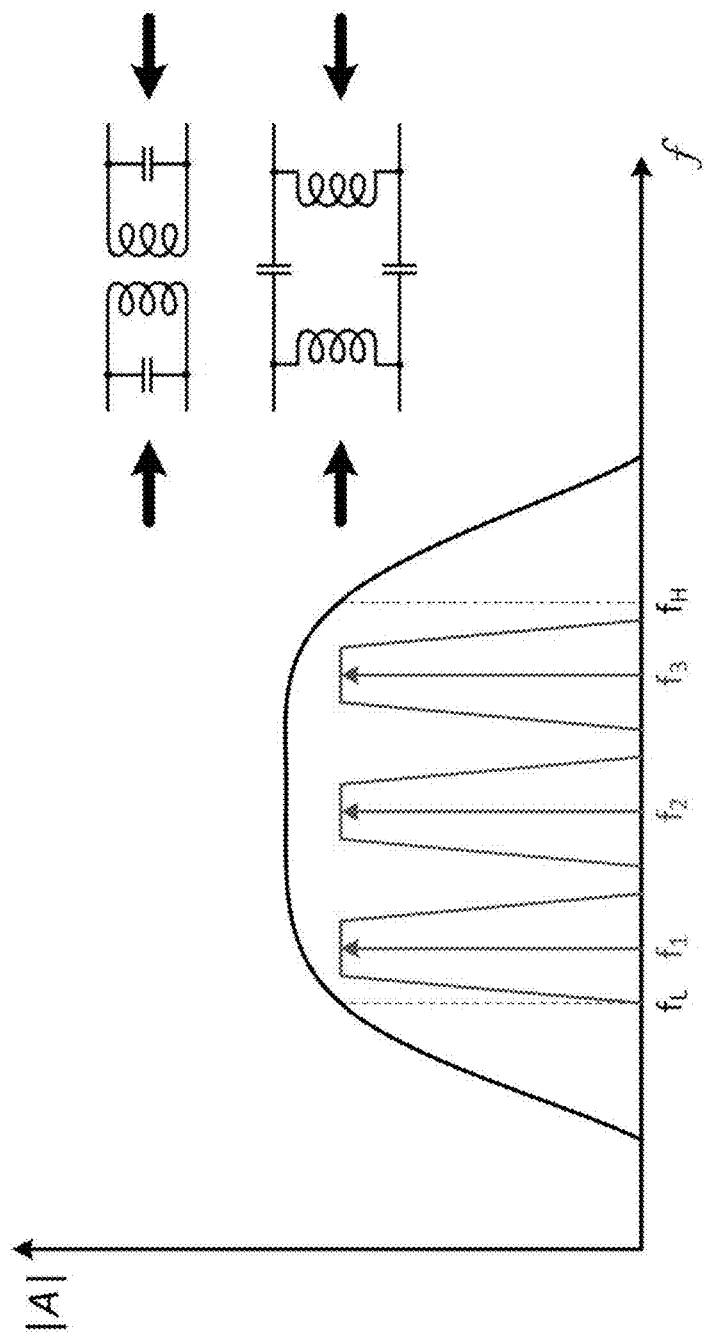
FIG. 11 illustrates a wideband frequency response of the isolation barrier, in the case of both capacitive and inductive coupling.

FIG. 10 illustrates another embodiment of the full-duplex communication scheme implemented by the device 100. According to this embodiment, the oscillators 204 on the first electronic side 102 are independent of and decoupled from the isolation barrier 106 by first capacitance decoupled voltage ('V') buffers 400. The oscillators 204 on the second electronic side 104 likewise are independent of and decoupled from the isolation barrier 106 by second capacitance decoupled voltage buffers 402. Accordingly, the isolation barrier 106 has a wideband frequency response as shown in FIG. 11 as compared to the narrowband frequency responses shown in FIGS. 5 and 7.

Figure 12:
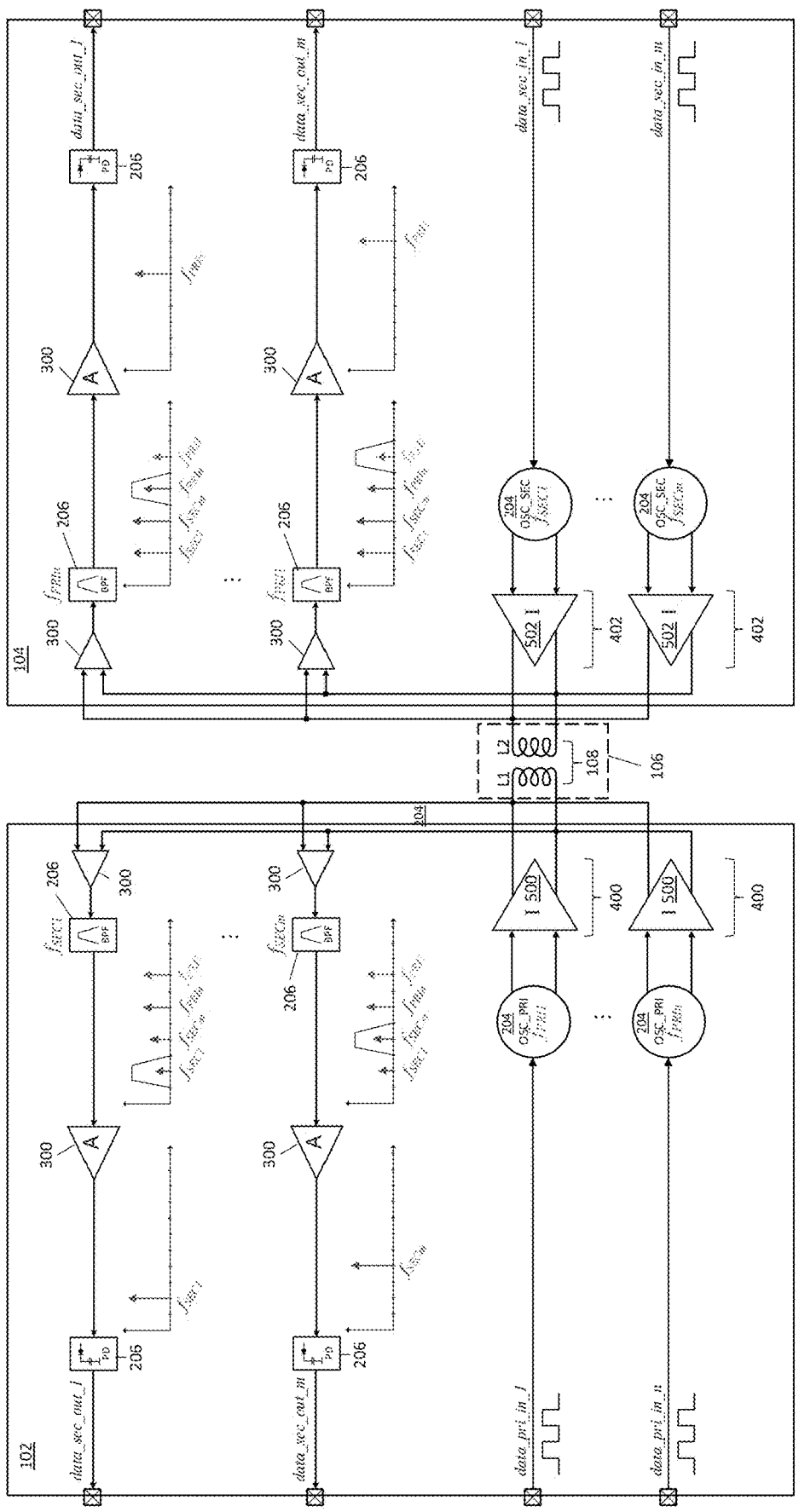
FIG. 12 illustrates another embodiment of a full-duplex communication scheme implemented by the device.

FIG. 12 illustrates another embodiment of the full-duplex communication scheme implemented by the device 100. According to this embodiment, the oscillators 204 on the first electronic side 102 are independent of and decoupled from the isolation barrier 106 by first directly coupled current ('I') buffers 500. The oscillators 204 on the second electronic side 104 likewise are independent of and decoupled from the isolation barrier 106 by second directly coupled current buffers 502. Accordingly, the isolation barrier 106 has a wideband frequency response as shown in FIG. 11 as compared to the narrowband frequency responses shown in FIGS. 5 and 7.

Depending on the oscillator embodiment used, different transmitter implementations are described next for the full-duplex communication schemes shown in FIGS. 3, 4, 6, 8, 9, 10 and 12.

Figure 13:
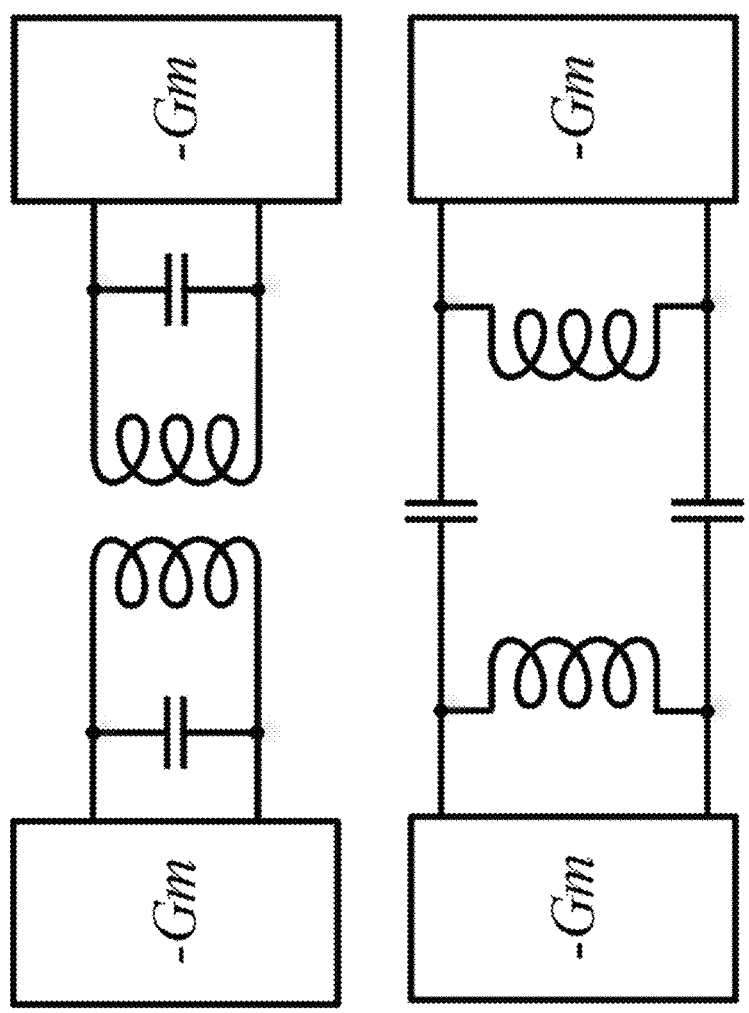
FIG. 13 illustrates a model of a first implementation that uses the reactance of the device isolation barrier as part of a resonator in an oscillator, with the upper half of FIG. 13 showing an inductive barrier model and the lower half of FIG. 13 showing a capacitive barrier model.

FIG. 13 illustrates a model of a first implementation that uses the reactance of the isolation barrier 106, e.g., the inductance of a transformer, as part of the resonator in the oscillator 204, as shown in FIGS. 4 and 6. The upper half of FIG. 13 shows a model for an inductive (transformer) barrier whereas the lower half of FIG. 13 shows a capacitive barrier model. In either case, the oscillator 204 includes a negative transconductance (−Gm) and an LC resonant tank, where the isolation barrier 106 is one part of the resonator. For the single oscillator embodiment shown in FIGS. 6, 8, and 9, the reactance of the isolation barrier 106 as considered in the model has a different frequency response than that for the dual oscillator embodiment shown in FIG. 4 and makes use of a single negative transconductance on the side where the single oscillator 204 is located. Also, only one of the two negative transconductances (−Gm) shown in FIG. 13 is used in FIGS. 6, 8, and 9 since only one oscillator 204 is present.

For the single oscillator embodiment shown in FIGS. 6, 8, and 9, the reactance of the isolation barrier 106 is considered to be part of the resonator of the single oscillator 204 which resides on one side 102/104 of the isolation barrier 106 and which transmits towards the other side 104/102. The device 100 if FIGS. 6, 8, and 9 can carry out a bi-directional communication through a passive realization on the other side 104/102 of the isolation barrier 106, which is used to implement the transmission in the opposite direction. The advantage of using a single oscillator 204 may be a lower overall power requirement with respect to a solution where an oscillator 204 is used at both sides 102, 104 of the isolation barrier 106.

Figure 7:
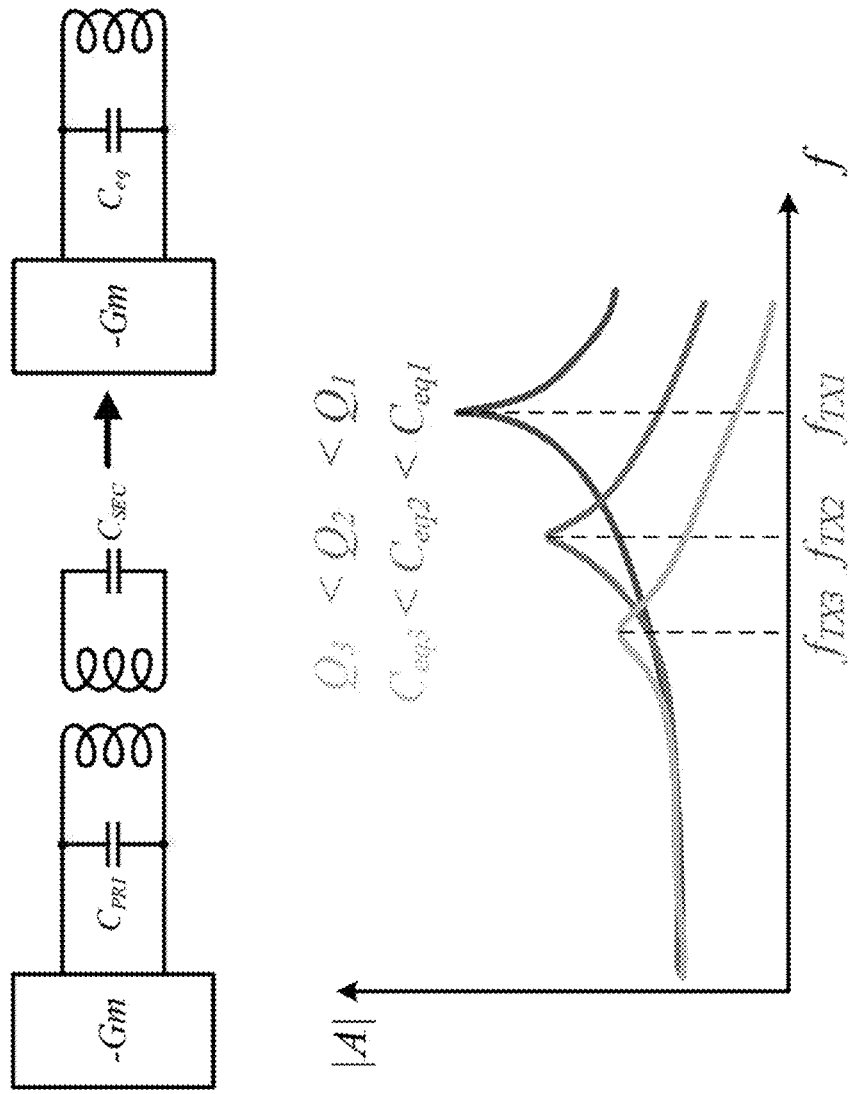
FIG. 7 illustrates resonance frequency dependency on the equivalent reactance of the isolation barrier.

The single oscillator 204 generates a transmitted signal with carrier frequency $f_{TX}$, which corresponds to the resonance frequency of an LC tank, as shown in FIG. 7. The isolation barrier 106 is shown as an inductive barrier in FIG. 7. FIG. 7 also shows the frequency response which depends on the transformer coupling coefficient and on the impedances $C_{PRI}$, $C_{SEC}$ connected either side of the isolation barrier 106. The variable reactance $C_{PRI}$ on the first electronic side 102 and the variable reactance $C_{SEC}$ on the second electronic side 104 form an equivalent reactance Ceq that shifts the carrier frequency $f_{TX}$ to one of a plurality of shifted frequencies $f_{PRI1} \ldots f_{PRIn}$. That is, the carrier frequency $f_{TX}$ is set by the total equivalent reactance Ceq seen by the oscillator 204, which in this example is the total equivalent reactance seen from the left side of the isolation barrier 106. The total equivalent reactance Ceq is determined by the reactances $C_{PRI}$ and $C_{SEC}$ at either side of the isolation barrier 106 in FIG. 6, and also by considering the effect of the coupling coefficient of the isolation barrier 106. At least one of the reactances $C_{PRI}$, $C_{SEC}$ at either side of the isolation barrier 106 is variable.

In the context of the simplified view of FIG. 6, the only variable reactance is the variable capacitance $C_{PRI}$ at the left side of the isolation barrier 106, while a fixed capacitance value is kept for $C_{SEC}$ at the right side of the isolation barrier 106. By changing the value of capacitance $C_{PRI}$ among n values, frequency $f_{TX}$ can be shifted to a frequency $f_{PRI1} \ldots f_{PRIn}$. For each of these n frequencies, a corresponding band pass filter 206 is present on the second electronic side 104 of the device 100 to detect to which frequency the signal with carrier at frequency $f_{TX}$ was shifted. In this way, one carrier frequency at $f_{TX}=f_{PRIj}$ (j=1 ... n) can be sent through any single $j^{th}$ right-side band pass filter 206 at a time.

In the context of the simplified view of FIG. 7 where the only variable reactance is the variable capacitance $C_{SEC}$ at the right side of the isolation barrier 106, while a fixed capacitance value is kept for $C_{PRI}$ at the left side of the isolation barrier 106. By changing the value of capacitance $C_{SEC}$ among m values, frequency $f_{TX}$ can be shifted to a frequency $f_{SEC1} \ldots f_{SECm}$. For each of these m frequencies, a corresponding band pass filter 206 is present on the first electronic side 102 of the device 100 to detect to which frequency the signal with carrier at frequency $f_{TX}$ was shifted. In this way, one carrier frequency at $f_{TX}=f_{SECi}$ (i=1 . . . m) can be sent through any single $i^{th}$ left side band pass filter 206 at a time.

The embodiments illustrated in FIGS. 8 and 9 establish one carrier frequency at a time, combining both solutions, as shown in FIG. 6, enables a simultaneous engagement of two communication channels in opposite directions (full duplex) across a single isolation barrier 106 by using a single oscillator 204 at one side 102/104 generating one carrier frequency at a time. As $C_{PRI}$ has n values and $C_{SEC}$ m values, up to k=m*n individual carrier frequencies can be generated, each of them falling into one pass band filter 206 at each side 102, 104.

Since changing the value of the variable reactance on either side 102, 104 may be used to encode information through the corresponding shift of frequency $f_{TX}$, so that the signal carrier can jump from one band pass filter 206 to another on the opposite side of the isolation barrier 106, a corresponding adaption of the pass band frequency position is necessary on the side where the reactance is changed. This way, a correct detection of the information flow coming from the opposite side is maintained. For example, $f_{TX}$ may be shifted from $f_{TX1}$ to $f_{TX2}$ by changing $C_{SEC}$ while a signal transmitted from left to right was being detected by the band pass filter 206 with center frequency $f_{PRI1}$. To maintain the detection of the unchanged ($C_{PRI}$ was kept constant) information flow from left to right through the band pass filter 206 at center frequency $f_{PRI1}$, also center frequency $f_{PRI1}$ should be shifted according to the same shift of $f_{TX}$, so that before the change at $C_{SEC}$ center frequency $f_{PRI}1=f_{TX1}$, while after the change at $C_{SEC}$ center frequency $f_{PRI}1=f_{TX2}$. The center frequencies $f_{PRI1}$ . . . $f_{PRIn}$ of all band pass filters 206 sitting on the right side should be shifted by the same value. This change can be achieved since both $C_{SEC}$ and the band pass filters 206 at center frequencies $f_{PRI1}$ . . . $f_{PRIn}$ sit on the same side of the isolation barrier 106 and hence the band pass filter 206 can be made adaptive according to the value set for $C_{SEC}$.

A similar procedure can be defined if $C_{PRI}$ is used instead for shifting $f_{TX}$. For example, $f_{TX}$ may be shifted from $f_{TX1}$ to $f_{TX2}$ by changing $C_{PRI}$ while a signal transmitted from right to left was being detected by the band pass filter 206 with center frequency $f_{SEC1}$. To keep the detection of the unchanged ($C_{SEC}$ was kept constant) information flow from left to right through the band pass filter 206 at center frequency $f_{SEC1}$, also center frequency $f_{SEC1}$ should be shifted according to the same shift of $f_{TX}$, so that before the change at $C_{PRI}$ center frequency fsEC1=$f_{TX1}$, while after the change at $C_{PRI}$ center frequency fsEC1=$f_{TX2}$. The center frequencies $f_{SEC1}$ . . . $fS_{ECm}$ of all band pass filters 206 sitting on the left side should be shifted by the same value. This change can be achieved since both $C_{PRI}$ and the band pass filters 206 at center frequencies $f_{SEC1}$ . . . $f_{SECm}$ sit on the same side of the isolation barrier 106 and hence the band pass filter 206 can be made adaptive according to the value set for $C_{PRI}$.

The oscillator frequency shifts and band pass filter center frequency shifts, according to the settings of the variable reactances $C_{SEC}$ and $O_{PRI}$, can be coded in a look up table similar to that shown in Table 1. The lookup table stores the available shifted center frequency options $f_{Tx11}$ . . . $f_{Txoo}$. The transceiver circuitry 110 retrieves the shifted center frequency from the lookup table that corresponds to the transmission reactance value provided by $C_{SEC}$ and $C_{PRI}$, and changes the center frequency of each bandpass filter 206 on the electronic side 102/104 at which the shift in the variable reactance is implemented to the corresponding shifted frequency retrieved from the lookup table.

Table 1 shows two reactance (capacitance in this example) values on each side 102, 104 as an example: $C_{PRI1}$, $C_{PRI2}$, $O_{SEC1}$, $C_{SEC2}$, so that 2*2=4 shifted frequencies $f_{TX11}$, $f_{TX10}$, $f_{TX01}$, and $f_{TX00}$ are available, with one communication channel activated simultaneously per each side 102, 104, as long as the carrier $f_{TX}$ generated by the single oscillator 204 is present. The band pass filter $f_{PRI0}$ for primary logic data 0 detects both shifted frequencies $f_{TX00}$ and $f_{TX01}$. For logic data 1, the band pass filter $f_{PRI1}$ detects the sifted frequencies $f_{TX10}$ and $f_{TX11}$. Band pass filter $f_{SEC0}$ for secondary logic data 0 detects both shifted frequencies $f_{TX00}$ and $f_{TX10}$. For logic data 0, the band pass filter $f_{SEC1}$ detects the shifted frequencies $f_{TX01}$ and $f_{TX11}$. The frequencies $f_{TX01}$ and $f_{TX10}$ may be the same frequency or different frequencies.

TABLE 1

2 × 2 Data Symbol Example

| data_pri | data_sec | $C_{PRI}$ | $C_{SEC}$ | $f_{TX}$ | $f_{PRI}$ | $f_{SEC}$ |
|---|---|---|---|---|---|---|
| 1 | 1 | $C_{PRI1}$ | $C_{SEC1}$ | $f_{TX11}$ | $f_{PRI1}$ | $f_{SEC1}$ |
| 1 | 0 | $C_{PRI1}$ | $C_{SEC0}$ | $f_{TX10}$ | $f_{PRI1}$ | $f_{SEC0}$ |
| 0 | 1 | $C_{PRI0}$ | $C_{SEC1}$ | $f_{TX01}$ | $f_{PRI0}$ | $f_{SEC1}$ |
| 0 | 0 | $C_{PRI0}$ | $C_{SEC0}$ | $f_{TX00}$ | $f_{PRI0}$ | $f_{SEC0}$ |

At either electronic side 102, 104 of the device 100, the variable reactance $C_{PRI}/C_{SEC}$ forms part of the equivalent reactance Ceq that is configured to shift the carrier frequency $f_{TX}$ such that information encoding in either direction is implemented by changing the corresponding variable reactance. The filter circuits on both electronic sides 102, 104 of the device 100 are frequency tuned based on the variable reactance. In the example given in Table 1, the transceiver circuitry 110 on either electronic side 102, 104 of the device 100 can set the corresponding variable reactance $C_{PRI}/C_{SEC}$ to a first reactance value $C_{PRI1}/C_{SEC1}$ to encode first data and to a second reactance value $C_{PRI2}/C_{SEC2}$ to encode second data. The same transceiver circuitry 110 changes the frequency tuning of the filter circuit on that electronic side 102, 104 of the device 100 if the corresponding variable reactance $C_{PRI}/C_{SEC}$ is changed from one reactance value to another reactance value.

More generally, information encoding is implemented by shifting a single carrier $f_{TX}$, with the data flow direction (second side to first or vice-versa) being determined based on whether the second electronic side 102 or the first electronic side 102 caused the frequency shift. With the number of m and n value higher than two, the communication channels can support not only single bit binary data but full symbols of data as indicated in Table 2 and Table 3. And m and n do not necessarily need to have the same value, means that the size of the symbols in each direction can be customized to the individual needs (see Table 2 which shows a 4×2 data symbol example).

TABLE 2

4 × 2 Data Symbol Example

| data_pri | data_sec | $C_{PRI}$ | $C_{SEC}$ | $f_{TX}$ | $f_{PRI}$ | $f_{SEC}$ |
|---|---|---|---|---|---|---|
| 11 | 1 | $C_{PRI3}$ | $C_{SEC1}$ | $f_{TX31}$ | $f_{PRI3}$ | $f_{SEC1}$ |
| 11 | 0 | $C_{PRI3}$ | $C_{SEC0}$ | $f_{TX30}$ | $f_{PRI3}$ | $f_{SEC0}$ |
| 10 | 1 | $C_{PRI2}$ | $C_{SEC1}$ | $f_{TX21}$ | $f_{PRI2}$ | $f_{SEC1}$ |
| 10 | 0 | $C_{PRI2}$ | $C_{SEC0}$ | $f_{TX20}$ | $f_{PRI2}$ | $f_{SEC0}$ |

TABLE 2-continued

4 × 2 Data Symbol Example

| data_pri | data_sec | $C_{PRI}$ | $C_{SEC}$ | $f_{TX}$ | $f_{PRI}$ | $f_{SEC}$ |
|---|---|---|---|---|---|---|
| 01 | 1 | $C_{PRI1}$ | $C_{SEC1}$ | $f_{TX11}$ | $f_{PRI1}$ | $f_{SEC1}$ |
| 01 | 0 | $C_{PRI1}$ | $C_{SEC0}$ | $f_{TX10}$ | $f_{PRI1}$ | $f_{SEC0}$ |
| 00 | 1 | $C_{PRI0}$ | $C_{SEC1}$ | $f_{TX01}$ | $f_{PRI0}$ | $f_{SEC1}$ |
| 00 | 0 | $C_{PRI0}$ | $C_{SEC0}$ | $f_{TX00}$ | $f_{PRI0}$ | $f_{SEC0}$ |

TABLE 3

4 × 4 Data Symbol Example

| data_pri | data_sec | $C_{PRI}$ | $C_{SEC}$ | $f_{TX}$ | $f_{PRI}$ | $f_{SEC}$ |
|---|---|---|---|---|---|---|
| 11 | 11 | $C_{PRI3}$ | $C_{SEC3}$ | $f_{TX33}$ | $f_{PRI3}$ | $f_{SEC3}$ |
| 11 | 10 | $C_{PRI3}$ | $C_{SEC2}$ | $f_{TX32}$ | $f_{PRI3}$ | $f_{SEC2}$ |
| 11 | 01 | $C_{PRI3}$ | $C_{SEC1}$ | $f_{TX31}$ | $f_{PRI3}$ | $f_{SEC1}$ |
| 11 | 00 | $C_{PRI3}$ | $C_{SEC0}$ | $f_{TX30}$ | $f_{PRI3}$ | $f_{SEC0}$ |
| 10 | 11 | $C_{PRI2}$ | $C_{SEC3}$ | $f_{TX23}$ | $f_{PRI2}$ | $f_{SEC3}$ |
| 10 | 10 | $C_{PRI2}$ | $C_{SEC2}$ | $f_{TX22}$ | $f_{PRI2}$ | $f_{SEC2}$ |
| 10 | 01 | $C_{PRI2}$ | $C_{SEC1}$ | $f_{TX21}$ | $f_{PRI2}$ | $f_{SEC1}$ |
| 10 | 00 | $C_{PRI2}$ | $C_{SEC0}$ | $f_{TX20}$ | $f_{PRI2}$ | $f_{SEC0}$ |
| 01 | 11 | $C_{PRI1}$ | $C_{SEC3}$ | $f_{TX13}$ | $f_{PRI1}$ | $f_{SEC3}$ |
| 01 | 10 | $C_{PRI1}$ | $C_{SEC2}$ | $f_{TX12}$ | $f_{PRI1}$ | $f_{SEC2}$ |
| 01 | 01 | $C_{PRI1}$ | $C_{SEC1}$ | $f_{TX11}$ | $f_{PRI1}$ | $f_{SEC1}$ |
| 01 | 00 | $C_{PRI1}$ | $C_{SEC0}$ | $f_{TX10}$ | $f_{PRI1}$ | $f_{SEC0}$ |
| 00 | 11 | $C_{PRI0}$ | $C_{SEC3}$ | $f_{TX03}$ | $f_{PRI0}$ | $f_{SEC3}$ |
| 00 | 10 | $C_{PRI0}$ | $C_{SEC2}$ | $f_{TX02}$ | $f_{PRI0}$ | $f_{SEC2}$ |
| 00 | 01 | $C_{PRI0}$ | $C_{SEC1}$ | $f_{TX01}$ | $f_{PRI0}$ | $f_{SEC1}$ |
| 00 | 00 | $C_{PRI0}$ | $C_{SEC0}$ | $f_{TX00}$ | $f_{PRI0}$ | $f_{SEC0}$ |

Since the side that transmits (sends) by carrying out a reactance change knows which reactance value is applied on its side, not every shifted frequency (k=m*n) needs to be generated to ensure proper decoding of the data on the opposite side and a back calculation may be used to determine the unique value that the other side is applying. For example, the frequencies $f_{TX01}$ and $f_{TX10}$ may be the same frequency for the single bit binary data example in Table 1. More generally for both single bit binary data (e.g., Table 1) and full symbols of data (e.g., Tables 2 and 3), there may not be m*n different frequencies depending on how many shifted frequencies are generated/used. In another example, information can be encoded by the single carrier frequency $f_{TX}$ falling in none of the bandpass filters on either side 102, 104 which also coincides with no carrier frequency generated at all.

Another transmitter implementation, which is based on FIGS. 10 and 12, is based on the oscillators 204 being indirectly coupled to the isolation barrier 106 by capacitance decoupled voltage buffers 400 (FIG. 10) or directly coupled current buffers 500 (FIG. 12). In either case, the isolation barrier 106 is decoupled from the oscillators 204. The isolation barrier 106, together with its associated reactances (parasitic or intentional ones), shows a sufficient broadband response which is possible through a proper sizing of the reactances associated to the isolation element.

In this case, the isolation barrier 106 can be considered as a broadband communication channel where more than one frequency carrier can be transmitted in either direction, e.g., as shown in FIG. 11. As a result, the equivalent network which can be associated with the isolation barrier 106 together with added (parasitic or intentional) reactances (e.g., as shown in FIGS. 10 and 12) has a relatively wideband passband response between a low frequency $f_L$ and a high frequency $f_H$ as shown in FIG. 11, instead of a narrowband response as in FIG. 5. The frequency span between $f_L$ and $f_H$ can be used to host a number of carrier frequencies $f_1, f_2, \ldots, f_n$ sent across the isolation barrier 106 in either direction, with transmitter and receiver circuitry 200, 202 placed on both sides 102, 104. A corresponding number of sufficiently narrow band pass filters 206 can be used to detect the transmitted carriers, e.g., as previously explained herein. FIG. 11 schematically illustrates that the isolation barrier 106 may provide inductive or capacitive coupling, also as previously described herein.

FIG. 11 shows the input to output broadband response from either side of the isolation barrier 106 when properly dimensioned. In this example, the bandwidth between $f_L$ and $f_H$ is used to host three carriers at frequencies $f_1, f_2, f_3$, which can be used to send information in either direction according to the embodiments shown in FIGS. 10 and 12. If the isolation barrier 106 has a wideband frequency response as indicated by FIG. 11, the transceiver circuitry 110 can include an oscillator 204 on the first electronic side 102 for each carrier frequency included in a first group of carrier frequencies within the wideband frequency response and an oscillator 204 on the second electronic side 104 for each carrier frequency included in a second group of carrier frequencies within the wideband frequency response. A bandpass filter 206 on the first electronic side 102 is tuned to each carrier frequency included in the second group of carrier frequencies, and a bandpass filter 206 on the second electronic side 104 is tuned to each carrier frequency included in the first group of carrier frequencies. FIGS. 10 and 12 both show such an implementation.

According to the wideband frequency response embodiment, the transceiver circuitry 110 simultaneously transmits a plurality of carrier frequencies from the first group modulated with first data 'data_pri_in_1' . . . 'data_pri_in_n' via the oscillators 204 on the first electronic side 102 and a plurality of carrier frequencies from the second group modulated with second data 'data_sec_in_1' . . . 'data_sec_in_m' via the oscillators 204 on the second electronic side 104. The transceiver circuitry 110 also simultaneously recovers the second data via the bandpass filters 206 on the first electronic side 102 and the first data via the bandpass filters 206 on the second electronic side 104.

In FIG. 10, the coupling of the oscillators 204 to the isolation barrier 106 is implemented through capacitor decoupled voltage buffers 400, which provide enough signal strength for a reliable transmission. The voltage buffers 400 are connected to the isolation barrier 106 through capacitors to decouple different drivers from each other in DC and to allow signals at different frequencies to be received at the same time while transmitting. To allow a reliable detection of the received signals, in AC the capacitive/inductive signal divider formed by the reactive elements of the isolation barrier 106 and all capacitances which connect the different voltage buffers 400 to the isolation barrier 106 should allow a sufficient amplitude for all the signals at the frequencies of interest. Capacitance and/or signal frequency values are selected accordingly.

Also, the capacitances added to decouple the voltage buffers 400 should not hinder the broadband response of the isolation barrier 106. In general, the oscillators 204 can be of any type, e.g., square wave, sine wave or any other type. However, as explained in more detail later, sine wave oscillators are preferred since ideally a sine wave has only one spectral component, which allows a more reliable detection at the receiver side and less constraints among different transmitted/received frequency carriers. For an oscillator which generates an output signal different than a sine wave, harmonic frequencies of the same or another oscillator may spuriously fall into unintended frequency bands, with the possibility of causing a wrong signal detection. The driver implementation should fit to the oscillator signal type and, e.g., can be in the form of simple CMOS inverters with sufficient driving strength (e.g., suitable for square wave oscillators), or voltage followers based on a more linear push-pull implementation (for sine wave or triangular wave oscillators).

The driver should avoid introducing too large harmonic distortion, by creating harmonics which were not initially present in the spectrum of the oscillator signal and which may be also wrongly detected by spuriously falling into unintended frequency bands. The current consumption of this implementation where oscillators 204 are coupled to drivers is higher compared to the one where the isolation barrier 106 is part of the resonator of the oscillator 204, but provides more freedom in the choice and spectral positioning of the different frequency carriers since, by decoupling the oscillator 204 from the isolation barrier 106, the constraint regarding the frequency locking of the oscillator 204 does not hold any more. This means that $f_{PRI1}$ and $f_{SEC1}$ can be chosen more independently, and that more than one frequency carrier can be transmitted from one side (e.g., $f_{PRI1}$ and $f_{PR2}$ from the first side 102, and $f_{SEC1}$ and $fs_{EC2}$ from the second side 104), which increases system flexibility and amount of data which can be sent simultaneously. However, if the data amount is still not enough, additional techniques previously explained herein such as time multiplexing, different modulation schemes, different carrier frequencies, etc. can be used to increase the data variety and throughput.

The embodiment illustrated in FIG. 12 is similar to the embodiment illustrated in FIG. 10 but uses current buffers 500 to couple the oscillators 204 to the broad band isolation network. With the clear advantages of not requiring added capacitances and allowing an easier signal summation at both ends of the isolation network, the implementation with current buffers 500 is subject to all other constraints and considerations already mentioned for the implementation with voltage buffers 400.

The receiver part of the device 100 may in general be the same for all transmitter embodiments. To separate the wanted frequency component in the spectrum, band-pass filters 206 may be used, whose center frequency is set around the wanted frequency carrier. Specific to the embodiment illustrated in FIGS. 6, 8 and 9, the band-pass center frequency is not fixed but instead adjusted according to the oscillator frequency set on turn based on the selected reactance value at either side of the isolation barrier 106. Based on the coding example given in Table 1, for detecting data_pri_in_1 on the second side 104, depending on data_sec_in_1 and data_sec_in_2, the band pass filter center frequency ($f_{PRI1}$) is set to either $f_{TX10}$, $f_{TX11}$ or $f_{TX12}$. For detecting data_sec_in_1 on the first side 102, while depending on data_pri_in_1 and data_pri_in_2, the $f_{SEC1}$ is to either $f_{TX11}$ or $f_{TX21}$.

The band pass filter out of band roll off and attenuation is defined by the out of band suppression requirements to sufficiently reject the other frequency carriers and their harmonics. The requirements on filter out of band roll off and attenuation can be different and more or less demanding, depending on the chosen oscillator topology, the related harmonic content, the spectral spacing among the different frequency carriers, and how many carriers can or have to be hosted by the bandwidth offered by the isolation barrier 106. Accordingly, for the embodiments illustrated in FIGS. 10 and 12, sine wave oscillators 204 in combination with low distortion voltage or current buffers 400, 500 are used.

For the embodiments illustrated in FIGS. 4 and 6, the harmonic content beside the carrier is assumed to be low, since the resonator band pass response already filters it out by delivering a sufficiently clean sine wave, which is then immediately coupled to the isolation barrier 106 which is part of the resonator. In case that high order band pass filters are required, some suitable implementations could be switched gmC filters, or cascading 2-3 stages of second order filters. In case that a switched gmC filter is used in the embodiments of FIGS. 4 and 6, a wide band decoupling buffer may be used to decouple the filter from the resonators, so that the oscillator operation is not adversely affected.

For the embodiments in FIGS. 10 and 12, the decoupling buffer 'V' may not be required if the decoupling offered by the decoupling capacitors or the current buffers 500 is sufficient. Depending on the signal amplitude resulting out of the band pass filters 206, the filtered signal can be amplified by an amplifier 300 with a bandwidth sufficient for the filtered signal and moderate gain. The signal can be detected by suitable detectors 206 depending on the applied modulation schemes. With a typical OOK peak detector, whose detection time is relatively short with respect to the maximum allowed system input to output data propagation delay, may be used to identify whether a carrier is present or absent in a selected frequency band. With more advanced modulations (e.g., amplitude, phase, and/or frequency) known detectors can be used after the band pass filters 206.

The embodiments described herein provide a communication technique applied to a single galvanic isolation barrier used as a combined communication channel to convey multiple electrical communication channels in either direction across the galvanic isolation barrier. The embodiments described herein provide for various implementations of signal generation, transmission and detection to enable the communication, by considering cases when the isolation network associated with the isolation barrier is set to offer a narrowband response and the isolation network is used as a part of a resonator, or when the isolation barrier is set to offer a wideband response and the isolation network used as an independent transmission means.

Although the present disclosure is not so limited, the following numbered examples demonstrate one or more aspects of the disclosure.

Example 1. A device, comprising: a first electronic side; a second electronic side; an isolation barrier galvanically isolating the first electronic side and the second electronic side from one another, the isolation barrier including a signal coupler configured to enable signaling between the first and second electronic sides over the isolation barrier via electromagnetic coupling; and transceiver circuitry included in both the first and second electronic sides and configured to implement, based on a frequency response profile of the isolation barrier, full-duplex communication between the first and second electronic sides using the same signal coupler.

Example 2. The device of example 1, wherein the second electronic side includes a gate driver for a power transistor, wherein the first electronic side includes control circuitry for the gate driver, and wherein the transceiver circuitry is configured to simultaneously transmit a modulation signal from the first electronic side to the second electronic side and a telemetry signal from the second electronic side to the first electronic side using the same signal coupler and based on the frequency response profile of the isolation barrier.

Example 3. The device of example 1 or 2, wherein the first electronic side is a primary side of a digital isolator, wherein the second electronic side is a secondary side of the digital isolator, and wherein the transceiver circuitry is configured to simultaneously transmit a first signal from the primary side to the secondary side and a second signal from the secondary side to the primary side using the same signal coupler and based on the frequency response profile of the isolation barrier.

Example 4. The device of any of examples 1 through 3, wherein the transceiver circuitry comprises: a first oscillator on the first electronic side and tuned to a first carrier frequency that corresponds to a first resonance frequency of the isolation barrier; a second oscillator on the second electronic side and tuned to a second carrier frequency that corresponds to a second resonance frequency of the isolation barrier; a first bandpass filter on the first electronic side and tuned to the second carrier frequency; and a second bandpass filter on the second electronic side and tuned to the first carrier frequency.

Example 5. The device of example 4, wherein the transceiver circuitry is configured to simultaneously transmit the first carrier frequency modulated with first data via the first oscillator and the second carrier frequency modulated with second data via the second oscillator, and wherein the transceiver circuitry is configured to simultaneously recover the second data via the first bandpass filter and the first data via the second bandpass filter.

Example 6. The device of example 4 or 5, wherein the second carrier frequency is a harmonic of the first carrier frequency.

Example 7. The device of any of examples 1 through 3, wherein the transceiver circuitry comprises: a single oscillator on the first electronic side and having a carrier frequency; a first variable reactance on the first electronic side; a second variable reactance on the second electronic side, the first variable reactance and the second variable reactance forming an equivalent reactance that is configured to shift the carrier frequency to one of a plurality of shifted frequencies; a first filter circuit on the first electronic side and having a bandpass filter tuned for the one of the plurality of shifted frequencies; and a second filter circuit on the second electronic side and having a bandpass filter tuned for the one of the plurality of shifted frequencies.

Example 8. The device of example 7, wherein the transceiver circuitry is configured to set the first variable reactance to a first reactance value based on first data at the first electronic side and to set the second variable reactance to a second reactance value based on second data at the second electronic side such that the equivalent reactance is set to a transmission reactance value and the carrier frequency is shifted to the one of the plurality of shifted frequencies, and wherein the transceiver circuitry is configured to simultaneously recover the second data via the bandpass filter of the first filter circuit tuned to a frequency associated with the second reactance value and the first data via the bandpass filter of the second filter circuit tuned to a frequency associated with the first reactance value.

Example 9. The device of example 7 or 8, wherein for a shift in the carrier frequency brought about by a change in the first variable reactance on the first electronic side or by a change in the second variable reactance on the second electronic side, the transceiver circuitry is configured to change a center frequency of each bandpass filter on the electronic side at which the shift in the variable reactance is implemented, by an amount corresponding to the shift in the carrier frequency.

Example 10. The device of example 9, wherein the transceiver circuitry comprises a lookup table that stores the plurality of shifted frequencies, and wherein the transceiver circuitry is configured to retrieve the one of the plurality of shifted frequencies and change the center frequency of each bandpass filter on the electronic side at which the shift in the variable reactance is implemented to the shifted frequency retrieved from the lookup table.

Example 11. The device of any of examples 1 through 3, wherein the isolation barrier has a wideband frequency response, and wherein the transceiver circuitry comprises: an oscillator on the first electronic side for each carrier frequency included in a first group of carrier frequencies within the wideband frequency response; an oscillator on the second electronic side for each carrier frequency included in a second group of carrier frequencies within the wideband frequency response; a bandpass filter on the first electronic side tuned to each carrier frequency included in the second group of carrier frequencies; and a bandpass filter on the second electronic side tuned to each carrier frequency included in the first group of carrier frequencies.

Example 12. The device of example 11, wherein the transceiver circuitry is configured to simultaneously transmit a plurality of carrier frequencies from the first group modulated with first data via the oscillators on the first electronic side and a plurality of carrier frequencies from the second group modulated with second data via the oscillators on the second electronic side, and wherein the transceiver circuitry is configured to simultaneously recover the second data via the bandpass filters on the first electronic side and the first data via the bandpass filters on the second electronic side.

Example 13. The device of example 11 or 12, wherein the oscillators on the first electronic side are independent of and decoupled from the isolation barrier by first capacitance decoupled voltage buffers, and wherein the oscillators on the second electronic side are independent of and decoupled from the isolation barrier by second capacitance decoupled voltage buffers.

Example 14. The device of example 11 or 12, wherein the oscillators on the first electronic side are independent of and decoupled from the isolation barrier by first directly coupled current buffers, and wherein the oscillators on the second electronic side are independent of and decoupled from the isolation barrier by second directly coupled current buffers.

Example 15. The device of any of examples 1 through 14, wherein the transceiver circuitry included in the first electronic side and/or the second electronic side is configured to implement multi-channel communication over the isolation barrier.

Example 16. A device, comprising: electronic circuitry; an isolation barrier galvanically isolating the electronic circuitry, the isolation barrier including a signal coupler configured to enable signaling over the isolation barrier via electromagnetic coupling; and transceiver circuitry configured to implement, based on a frequency response profile of the isolation barrier, full-duplex communication between the electronic circuitry of the device and electronic circuitry of another device using the same signal coupler.

Example 17. The device of example 16, wherein the transceiver circuitry comprises: an oscillator tuned to a first carrier frequency that corresponds to a first resonance frequency of the isolation barrier; and a bandpass filter tuned to a second carrier frequency that is a harmonic of the first carrier frequency.

Example 18. The device of example 17, wherein the transceiver circuitry is configured to simultaneously transmit the first carrier frequency modulated with first data via the oscillator and receive the second carrier frequency modulated with second data via the bandpass filter.

Example 19. The device of example 16, wherein the transceiver circuitry comprises: a single oscillator having a carrier frequency; a variable reactance forming part of an equivalent reactance that is configured to shift the carrier frequency to a first one of a plurality of shifted frequencies; and a filter circuit having a bandpass filter tuned for the one of the plurality of shifted frequencies.

Example 20. The device of example 19, wherein the transceiver circuitry is configured to set the variable reactance to a first reactance value to encode first data and to a second reactance value to encode second data.

Example 21. The device of example 19 or 20, wherein the transceiver circuitry is configured to change the frequency tuning of the filter circuit if the variable reactance is changed from one reactance value to another reactance value.

Example 22. The device of any of examples 16 through 18, wherein the isolation barrier has a wideband frequency response, and wherein the transceiver circuitry comprises: an oscillator for each carrier frequency included in a first group of carrier frequencies within the wideband frequency response; and a bandpass filter tuned to each carrier frequency included in a second group of carrier frequencies within the wideband frequency response.

Example 23. The device of example 22, wherein the transceiver circuitry is configured to simultaneously transmit a plurality of carrier frequencies from the first group modulated with first data via the oscillators and receive a plurality of carrier frequencies from the second group modulated with second data via the bandpass filters.

Example 24. The device of any of examples 15 through 23, wherein the transceiver circuitry is configured to implement multi-channel communication over the isolation barrier.

Example 25. A method of communicating data between first and second electronic sides of a device that are galvanically isolated from one another by an isolation barrier having a signal coupler that enables signaling between the first and second electronic sides over the isolation barrier via electromagnetic coupling, the method comprising: implementing, based on a frequency response profile of the isolation barrier, full-duplex communication between the first and second electronic sides using the same signal coupler, wherein implementing the full-duplex communication comprises: tuning a first oscillator on the first electronic side to a first carrier frequency that corresponds to a first resonance frequency of the isolation barrier; tuning a second oscillator on the second electronic side to a second carrier frequency that corresponds to a second resonance frequency of the isolation barrier; tuning a first bandpass filter on the first electronic side to the second carrier frequency; and tuning a second bandpass filter on the second electronic side to the first carrier frequency, or wherein implementing the full-duplex communication comprises: generating a carrier frequency via a single oscillator on the first electronic side; selecting a first variable reactance on the first electronic side and a second variable reactance on the second electronic side, the first variable reactance and the second variable reactance forming an equivalent reactance that is configured to shift the carrier frequency to one of a plurality of shifted frequencies; tuning a first filter circuit on the first electronic side based on the first variable reactance selected on the first electronic side; and tuning a second filter circuit on the second electronic side based on the second variable reactance selected on the second electronic side.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A device, comprising:
a first electronic side;
a second electronic side;
an isolation barrier galvanically isolating the first electronic side and the second electronic side from one another, the isolation barrier including a signal coupler configured to enable signaling between the first and second electronic sides over the isolation barrier via electromagnetic coupling; and
transceiver circuitry included in both the first and second electronic sides and configured to implement, based on a frequency response profile of the isolation barrier, full-duplex communication between the first and second electronic sides using the same signal coupler,
wherein the second electronic side includes a gate driver for a power transistor,
wherein the first electronic side includes control circuitry for the gate driver,
wherein the transceiver circuitry is configured to simultaneously transmit a modulation signal from the first electronic side to the second electronic side and a telemetry signal from the second electronic side to the first electronic side using the same signal coupler and based on the frequency response profile of the isolation barrier.

2. The device of claim 1, wherein the first electronic side is a primary side of a digital isolator, wherein the second electronic side is a secondary side of the digital isolator, and wherein the transceiver circuitry is configured to simultaneously transmit a first signal from the primary side to the secondary side and a second signal from the secondary side to the primary side using the same signal coupler and based on the frequency response profile of the isolation barrier.

3. The device of claim 1, wherein the transceiver circuitry comprises:
a first oscillator on the first electronic side and tuned to a first carrier frequency that corresponds to a first resonance frequency of the isolation barrier;
a second oscillator on the second electronic side and tuned to a second carrier frequency that corresponds to a second resonance frequency of the isolation barrier;
a first bandpass filter on the first electronic side and tuned to the second carrier frequency; and
a second bandpass filter on the second electronic side and tuned to the first carrier frequency.

4. The device of claim 3, wherein the transceiver circuitry is configured to simultaneously transmit the first carrier frequency modulated with first data via the first oscillator and the second carrier frequency modulated with second data via the second oscillator, and wherein the transceiver circuitry is configured to simultaneously recover the second data via the first bandpass filter and the first data via the second bandpass filter.

5. The device of claim 3, wherein the second carrier frequency is a harmonic of the first carrier frequency.

6. The device of claim 1, wherein the transceiver circuitry comprises:
a single oscillator on the first electronic side and having a carrier frequency;
a first variable reactance on the first electronic side;
a second variable reactance on the second electronic side, the first variable reactance and the second variable reactance forming an equivalent reactance that is configured to shift the carrier frequency to one of a plurality of shifted frequencies;
a first filter circuit on the first electronic side and having a bandpass filter tuned for the one of the plurality of shifted frequencies; and
a second filter circuit on the second electronic side and having a bandpass filter tuned for the one of the plurality of shifted frequencies.

7. The device of claim 6, wherein the transceiver circuitry is configured to set the first variable reactance to a first reactance value based on first data at the first electronic side and to set the second variable reactance to a second reactance value based on second data at the second electronic side such that the equivalent reactance is set to a transmission reactance value and the carrier frequency is shifted to the one of the plurality of shifted frequencies, and wherein the transceiver circuitry is configured to simultaneously recover the second data via the bandpass filter of the first filter circuit tuned to a frequency associated with the second reactance value and the first data via the bandpass filter of the second filter circuit tuned to a frequency associated with the first reactance value.

8. The device of claim 6, wherein for a shift in the carrier frequency brought about by a change in the first variable reactance on the first electronic side or by a change in the second variable reactance on the second electronic side, the transceiver circuitry is configured to change a center frequency of each bandpass filter on the electronic side at which the shift in the variable reactance is implemented, by an amount corresponding to the shift in the carrier frequency.

9. The device of claim 6, wherein the transceiver circuitry comprises a lookup table that stores the plurality of shifted frequencies, and wherein the transceiver circuitry is configured to retrieve the one of the plurality of shifted frequencies and change the center frequency of each bandpass filter on the electronic side at which the shift in the variable reactance is implemented to the shifted frequency retrieved from the lookup table.

10. The device of claim 1, wherein the isolation barrier has a wideband frequency response, and wherein the transceiver circuitry comprises:
an oscillator on the first electronic side for each carrier frequency included in a first group of carrier frequencies within the wideband frequency response;
an oscillator on the second electronic side for each carrier frequency included in a second group of carrier frequencies within the wideband frequency response;
a bandpass filter on the first electronic side tuned to each carrier frequency included in the second group of carrier frequencies; and
a bandpass filter on the second electronic side tuned to each carrier frequency included in the first group of carrier frequencies.

11. The device of claim 10, wherein the transceiver circuitry is configured to simultaneously transmit a plurality of carrier frequencies from the first group modulated with first data via the oscillators on the first electronic side and a plurality of carrier frequencies from the second group modulated with second data via the oscillators on the second electronic side, and wherein the transceiver circuitry is configured to simultaneously recover the second data via the bandpass filters on the first electronic side and the first data via the bandpass filters on the second electronic side.

12. The device of claim 10, wherein the oscillators on the first electronic side are independent of and decoupled from the isolation barrier by first capacitance decoupled voltage buffers, and wherein the oscillators on the second electronic side are independent of and decoupled from the isolation barrier by second capacitance decoupled voltage buffers.

13. The device of claim 10, wherein the oscillators on the first electronic side are independent of and decoupled from the isolation barrier by first directly coupled current buffers, and wherein the oscillators on the second electronic side are independent of and decoupled from the isolation barrier by second directly coupled current buffers.

14. The device of claim 1, wherein the transceiver circuitry included in the first electronic side and/or the second electronic side is configured to implement multi-channel communication over the isolation barrier.

15. A device, comprising:
electronic circuitry;
an isolation barrier galvanically isolating the electronic circuitry, the isolation barrier including a signal coupler configured to enable signaling over the isolation barrier via electromagnetic coupling; and
transceiver circuitry configured to implement, based on a frequency response profile of the isolation barrier, full-duplex communication between the electronic circuitry of the device and electronic circuitry of another device using the same signal coupler,
wherein the transceiver circuitry comprises an oscillator tuned to a first carrier frequency that corresponds to a first resonance frequency of the isolation barrier and a bandpass filter tuned to a second carrier frequency that is a harmonic of the first carrier frequency,
wherein the transceiver circuitry is configured to simultaneously transmit the first carrier frequency modulated with first data via the oscillator and receive the second carrier frequency modulated with second data via the bandpass filter.

16. The device of claim 15, wherein the transceiver circuitry is configured to implement multi-channel communication over the isolation barrier.

17. A device, comprising:
electronic circuitry;
an isolation barrier galvanically isolating the electronic circuitry, the isolation barrier including a signal coupler configured to enable signaling over the isolation barrier via electromagnetic coupling; and
transceiver circuitry configured to implement, based on a frequency response profile of the isolation barrier, full-duplex communication between the electronic circuitry of the device and electronic circuitry of another device using the same signal coupler, wherein the transceiver circuitry comprises:
  a single oscillator having a carrier frequency;
  a variable reactance forming part of an equivalent reactance that is configured to shift the carrier frequency such that information encoding at the device is implemented by changing the variable reactance; and
  a filter circuit frequency tuned based on the variable reactance.

18. The device of claim 17, wherein the transceiver circuitry is configured to set the variable reactance to a first reactance value to encode first data and to a second reactance value to encode second data.

19. The device of claim 17, wherein the transceiver circuitry is configured to change the frequency tuning of the filter circuit if the variable reactance is changed from one reactance value to another reactance value.

20. A device, comprising:
  electronic circuitry;
  an isolation barrier galvanically isolating the electronic circuitry, the isolation barrier including a signal coupler configured to enable signaling over the isolation barrier via electromagnetic coupling; and
  transceiver circuitry configured to implement, based on a frequency response profile of the isolation barrier, full-duplex communication between the electronic circuitry of the device and electronic circuitry of another device using the same signal coupler,
  wherein the isolation barrier has a wideband frequency response,
  wherein the transceiver circuitry comprises an oscillator for each carrier frequency included in a first group of carrier frequencies within the wideband frequency response and a bandpass filter tuned to each carrier frequency included in a second group of carrier frequencies within the wideband frequency response,
  wherein the transceiver circuitry is configured to simultaneously transmit a plurality of carrier frequencies from the first group modulated with first data via the oscillators and receive a plurality of carrier frequencies from the second group modulated with second data via the bandpass filters.

21. A device, comprising:
  a first electronic side;
  a second electronic side;
  an isolation barrier galvanically isolating the first electronic side and the second electronic side from one another, the isolation barrier including a signal coupler configured to enable signaling between the first and second electronic sides over the isolation barrier via electromagnetic coupling; and
  transceiver circuitry included in both the first and second electronic sides and configured to implement, based on a frequency response profile of the isolation barrier, full-duplex communication between the first and second electronic sides using the same signal coupler,
  wherein the transceiver circuitry comprises:
    a first oscillator on the first electronic side and tuned to a first carrier frequency that corresponds to a first resonance frequency of the isolation barrier;
    a second oscillator on the second electronic side and tuned to a second carrier frequency that corresponds to a second resonance frequency of the isolation barrier;
    a first bandpass filter on the first electronic side and tuned to the second carrier frequency; and
    a second bandpass filter on the second electronic side and tuned to the first carrier frequency,
  wherein the transceiver circuitry is configured to simultaneously transmit the first carrier frequency modulated with first data via the first oscillator and the second carrier frequency modulated with second data via the second oscillator,
  wherein the transceiver circuitry is configured to simultaneously recover the second data via the first bandpass filter and the first data via the second bandpass filter.

22. A device, comprising:
  a first electronic side;
  a second electronic side;
  an isolation barrier galvanically isolating the first electronic side and the second electronic side from one another, the isolation barrier including a signal coupler configured to enable signaling between the first and second electronic sides over the isolation barrier via electromagnetic coupling; and
  transceiver circuitry included in both the first and second electronic sides and configured to implement, based on a frequency response profile of the isolation barrier, full-duplex communication between the first and second electronic sides using the same signal coupler,
  wherein the transceiver circuitry comprises:
    a single oscillator on the first electronic side and having a carrier frequency;
    a first variable reactance on the first electronic side;
    a second variable reactance on the second electronic side, the first variable reactance and the second variable reactance forming an equivalent reactance that is configured to shift the carrier frequency to one of a plurality of shifted frequencies;
    a first filter circuit on the first electronic side and having a bandpass filter tuned for the one of the plurality of shifted frequencies; and
    a second filter circuit on the second electronic side and having a bandpass filter tuned for the one of the plurality of shifted frequencies.

23. The device of claim 22, wherein the transceiver circuitry is configured to set the first variable reactance to a first reactance value based on first data at the first electronic side and to set the second variable reactance to a second reactance value based on second data at the second electronic side such that the equivalent reactance is set to a transmission reactance value and the carrier frequency is shifted to the one of the plurality of shifted frequencies, and wherein the transceiver circuitry is configured to simultaneously recover the second data via the bandpass filter of the first filter circuit tuned to a frequency associated with the second reactance value and the first data via the bandpass filter of the second filter circuit tuned to a frequency associated with the first reactance value.

24. The device of claim 22, wherein for a shift in the carrier frequency brought about by a change in the first variable reactance on the first electronic side or by a change in the second variable reactance on the second electronic side, the transceiver circuitry is configured to change a center frequency of each bandpass filter on the electronic side at which the shift in the variable reactance is implemented, by an amount corresponding to the shift in the carrier frequency.

25. The device of claim 22, wherein the transceiver circuitry comprises a lookup table that stores the plurality of shifted frequencies, and wherein the transceiver circuitry is configured to retrieve the one of the plurality of shifted frequencies and change the center frequency of each bandpass filter on the electronic side at which the shift in the variable reactance is implemented to the shifted frequency retrieved from the lookup table.

26. A device, comprising:
a first electronic side;
a second electronic side;
an isolation barrier galvanically isolating the first electronic side and the second electronic side from one another, the isolation barrier including a signal coupler configured to enable signaling between the first and second electronic sides over the isolation barrier via electromagnetic coupling; and
transceiver circuitry included in both the first and second electronic sides and configured to implement, based on a frequency response profile of the isolation barrier, full-duplex communication between the first and second electronic sides using the same signal coupler,
wherein the isolation barrier has a wideband frequency response,
wherein the transceiver circuitry comprises:
an oscillator on the first electronic side for each carrier frequency included in a first group of carrier frequencies within the wideband frequency response;
an oscillator on the second electronic side for each carrier frequency included in a second group of carrier frequencies within the wideband frequency response;
a bandpass filter on the first electronic side tuned to each carrier frequency included in the second group of carrier frequencies; and
a bandpass filter on the second electronic side tuned to each carrier frequency included in the first group of carrier frequencies,
wherein the transceiver circuitry is configured to simultaneously transmit a plurality of carrier frequencies from the first group modulated with first data via the oscillators on the first electronic side and a plurality of carrier frequencies from the second group modulated with second data via the oscillators on the second electronic side,
wherein the transceiver circuitry is configured to simultaneously recover the second data via the bandpass filters on the first electronic side and the first data via the bandpass filters on the second electronic side.

* * * * *